United States Patent [19]
Bolen et al.

[11] Patent Number: 6,001,410
[45] Date of Patent: Dec. 14, 1999

[54] FRUIT LIQUEUR BEVERAGE CONTAINING RECOMBINANT MONELLIN TO ENHANCE THE ALCOHOLIC IMPACT

[75] Inventors: Paul L. Bolen, Middletown, N.J.; Nicholas Kossiakoff, Chambourcy, France; Regina D. Hawn, Matawan; Lewis G. Scharpf, Jr., Fair Haven, both of N.J.

[73] Assignee: International Flavors & Fragrances Inc., New York, N.Y.

[21] Appl. No.: 08/813,884

[22] Filed: Mar. 6, 1997

Related U.S. Application Data

[60] Provisional application No. 60/022,597, Jul. 25, 1996.
[51] Int. Cl.⁶ ...................................................... C12G 3/06
[52] U.S. Cl. ........................... 426/592; 426/534; 426/656
[58] Field of Search ..................................... 426/534, 592, 426/650, 656

[56] References Cited

U.S. PATENT DOCUMENTS

| | | | |
|---|---|---|---|
| 3,843,809 | 10/1974 | Luck | 426/592 |
| 3,973,050 | 8/1976 | Hayashibara et al. | 426/552 |
| 4,292,336 | 9/1981 | Latymer | 426/548 |
| 4,412,984 | 11/1983 | van der Loo et al. | 424/58 |
| 4,816,280 | 3/1989 | Billings | 426/548 |
| 4,917,913 | 4/1990 | Buckholz et al. | 426/536 |
| 4,943,443 | 7/1990 | Evers | 426/569 |
| 4,999,207 | 3/1991 | Buckholz, Jr. et al. | 426/536 |
| 5,234,834 | 8/1993 | Fischer et al. | 435/320.1 |
| 5,264,558 | 11/1993 | Kim et al. | 530/402 |
| 5,366,747 | 11/1994 | Buckholz, Jr. et al. | 426/536 |
| 5,478,923 | 12/1995 | Kim et al. | 530/300 |

*Primary Examiner*—Curtis E. Sherrer
*Attorney, Agent, or Firm*—Arthur L. Liberman

[57] ABSTRACT

Described is the use of a recombinant single-strand monellin taken alone or further together with sclareolide and/or succinic acid for enhancing the alcoholic impact of a fruit liqueur beverage.

10 Claims, 8 Drawing Sheets

AMINO ACID SEQUENCE OF NATURAL MONELLIN

A-Chain
1

*PHE ARG GLU ILE LYS GLY TYR GLU TYR GLN
LEU TYR VAL TYR ALA SER ASP LYS LEU PHE
ARG ALA ASP ILE SER GLU ASP TYR LYS THR
ARG GLY ARG LYS LEU LEU ARG PHE ASN GLY
PRO VAL PRO PRO PRO
                45

B-Chain
1

GLY GLU TRP GLU ILE ILE ASP ILE GLY PRO
PHE THR GLN ASN LEU GLY LYS PHE ALA VAL
ASP GLU GLU ASN LYS ILE GLY GLN TYR GLY
ARG LEU THR PHE ASN LYS VAL ILE ARG PRO
CYS MET LYS LYS THR ILE TYR GLU ASN GLU
                                      50

* PHE presents only in 10 % of natural monellin.

FIG.1

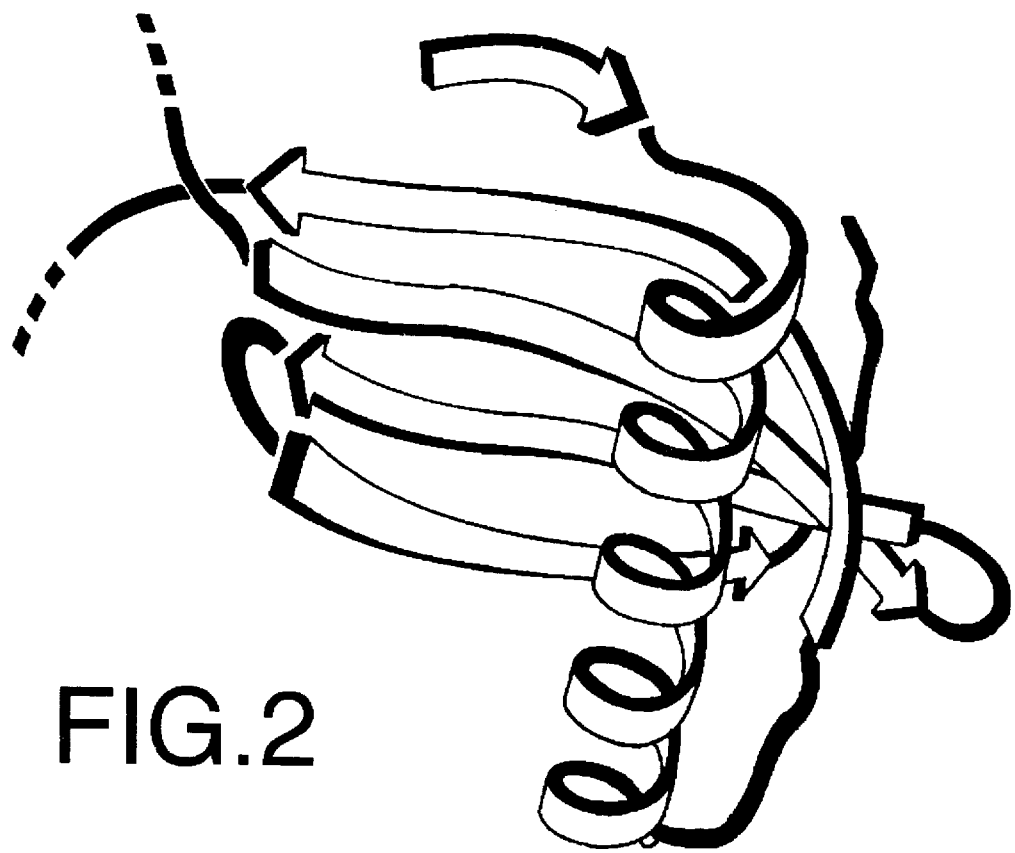

```
5'-ATG GGA GGA TGG GAA ATT ATC GAT ATT GGA CCA TTC ACT CAA AAC TTG GGT AAG TTC GCT
   Met Gly Gly Trp Glu Ile Ile Asp Ile Gly Pro Phe Thr Gln Asn Leu Gly Lys Phe Ala
                                         30                                       60

GTT GAC GAA AAC AAG ATT ATT CAA TAT GGT GGT AGA TTG ACT TTC AAC AAG GTT ATT AGA
   Val Asp Glu Asn Lys Ile Ile Gln Tyr Gly Gly Arg Leu Thr Phe Asn Lys Val Ile Arg
              ←————————— B —————————→
                                         90                                      120

CCA TGT ATG AAG AAG ACT ATT TAC AAC TAC GAA ATT AAG TTC AAG GGG TAC GAA CAA CAA
   Pro Cys Met Lys Lys Thr Ile Tyr Asn Tyr Glu Ile Lys Phe Lys Gly Tyr Glu Gln Gln
                                        150                                      180

TTG TAC GCT TCT GAC AAG CTT AGA GAA AGA GCT GAC ATT TCT GAA GAC TAC AAG ACC
   Leu Tyr Ala Ser Asp Lys Leu Arg Glu Arg Ala Asp Ile Ser Glu Asp Tyr Lys Thr
                                        210                         ←——— A ———→ 240

CGC GGT AGA AAG TTG AGA TTC AAC AGA TTC CCA GTT CCA CCA CCA CCA -3'
   Arg Gly Arg Lys Leu Arg Phe Asn Arg Phe Pro Val Pro Pro Pro Pro
                                        270
```

FIG.3-B(i)

| | | | | | |
|---|---|---|---|---|---|
| Gly | Glu | Trp | Glu | Ile | Asp Ile Gly Pro Phe Thr Gln Asn Leu Gly |
| 1 | | | | 5 | 10 15 |
| Lys | Phe | Ala | Val | Asp | Glu Asn Lys Ile Gly Gln Tyr Gly Arg Ieu |
| | | | | 20 | 25 30 |
| Thr | Phe | Asn | Lys | Val | Ile Arg Pro Cys Met Lys Lys Thr Ile Tyr Glu |
| | | | | | 35 40 45 |
| Asn | Glu | Xaa | Phe | Arg | Glu Ile Lys Gly Tyr Glu Tyr Gln Leu Tyr Val |
| | | | | | 50 55 60 |
| Tyr | Ala | Ser | Asp | Lys | Leu Phe Arg Ala Asp Ile Ser Glu Asp Tyr Lys |
| 65 | | | | | 70 75 80 |
| Thr | Arg | Gly | Arg | Lys | Leu Leu Arg Phe Asn Gly Pro Val Pro Pro Pro |
| | | | | 85 | 90 95 |

FIG.3-B(ii)

```
ATG  GGC  GAG  TGG  GAA  ATC  ATC  GAT  ATC  GGT  CCA  TTC  ACT  CAA  AAC  TTG
Met  Gly  Glu  Trp  Glu  Ile  Ile  Asp  Ile  Gly  Pro  Phe  Thr  Gln  Asn  Leu
 1                         5                   10                        15

GGT  AAA  TTC  GCT  GTT  GAT  GAA  GAA  AAC  ATT  GGC  CAA  TAC  GGT  AGA
Gly  Lys  Phe  Ala  Val  Asp  Glu  Glu  Asn  Ile  Gly  Gln  Tyr  Gly  Arg
                20                   25                   30

TTG  ACC  TTT  AAC  AAG  GTT  ATC  AGA  CCA  AAG  TGC  ATG  AAG  ACT  ATT  TAC
Leu  Thr  Phe  Asn  Lys  Val  Ile  Arg  Pro  Lys  Cys  Met  Lys  Thr  Ile  Tyr
                    35                   40                        45

GAA  AAC  GAA  GGT  TTT  AGA  GAA  ATT  AAG  GGT  TAC  TCC  CAA  TTG
Glu  Asn  Glu  Gly  Phe  Arg  Glu  Ile  Lys  Gly  Tyr  Ser  Gln  Leu
                50                   55                   60

GTA  TAC  GCT  TCT  GAC  AAG  TTG  TTC  CGT  GCT  GAC  ATT  TCC  GAA  GAC
Val  Tyr  Ala  Ser  Asp  Lys  Leu  Phe  Arg  Ala  Asp  Ile  Ser  Glu  Asp
 65                      70                   75

AAG  ACA  CGT  GGT  CGT  AAG  TTG  AGA  TTC  AAC  GCT  GGT  CCA  GTC  CCA
Lys  Thr  Arg  Gly  Arg  Lys  Leu  Arg  Phe  Asn  Ala  Gly  Pro  Val  Pro
 80                      85                   90                        95
```

FIG.4-A
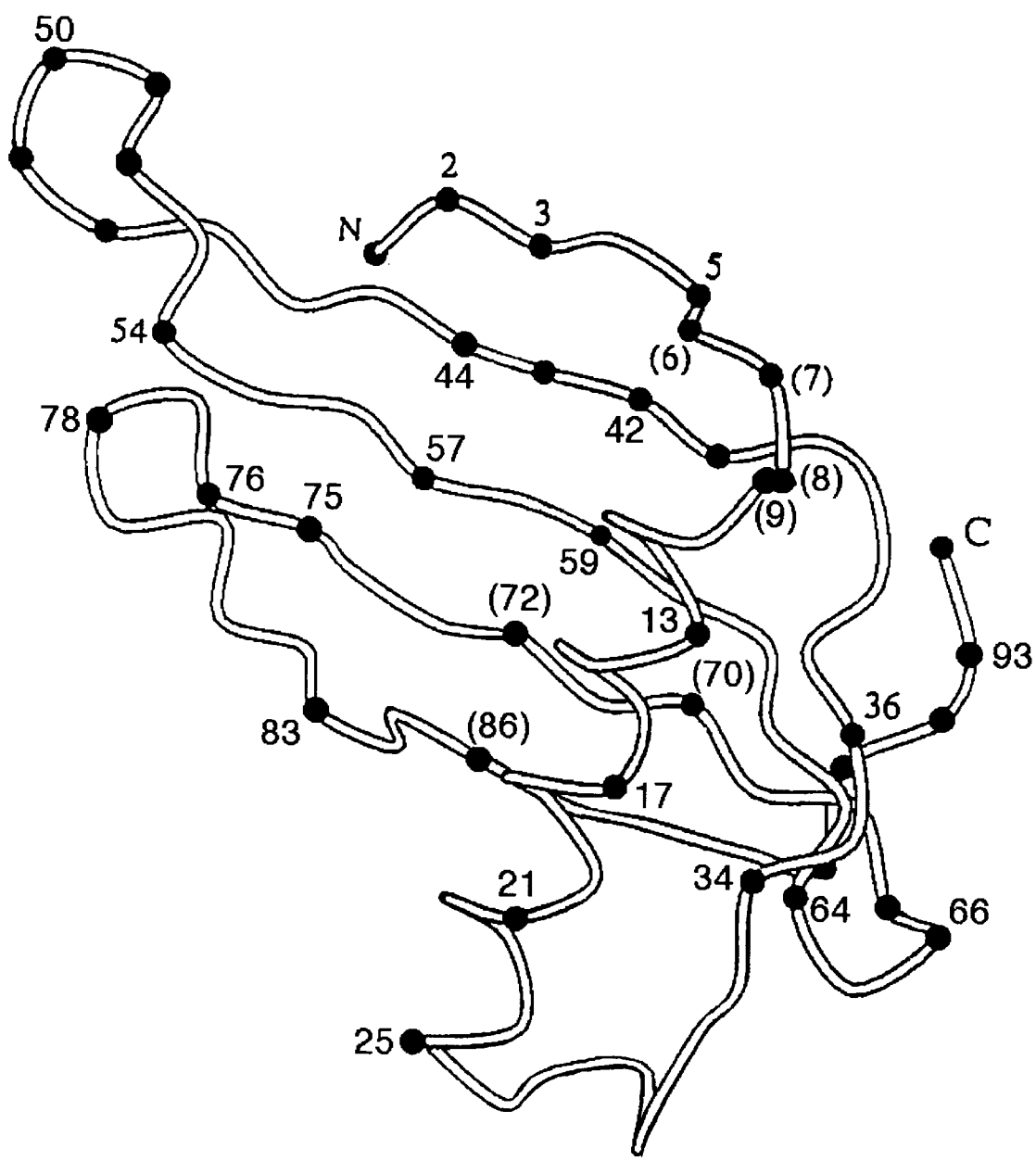

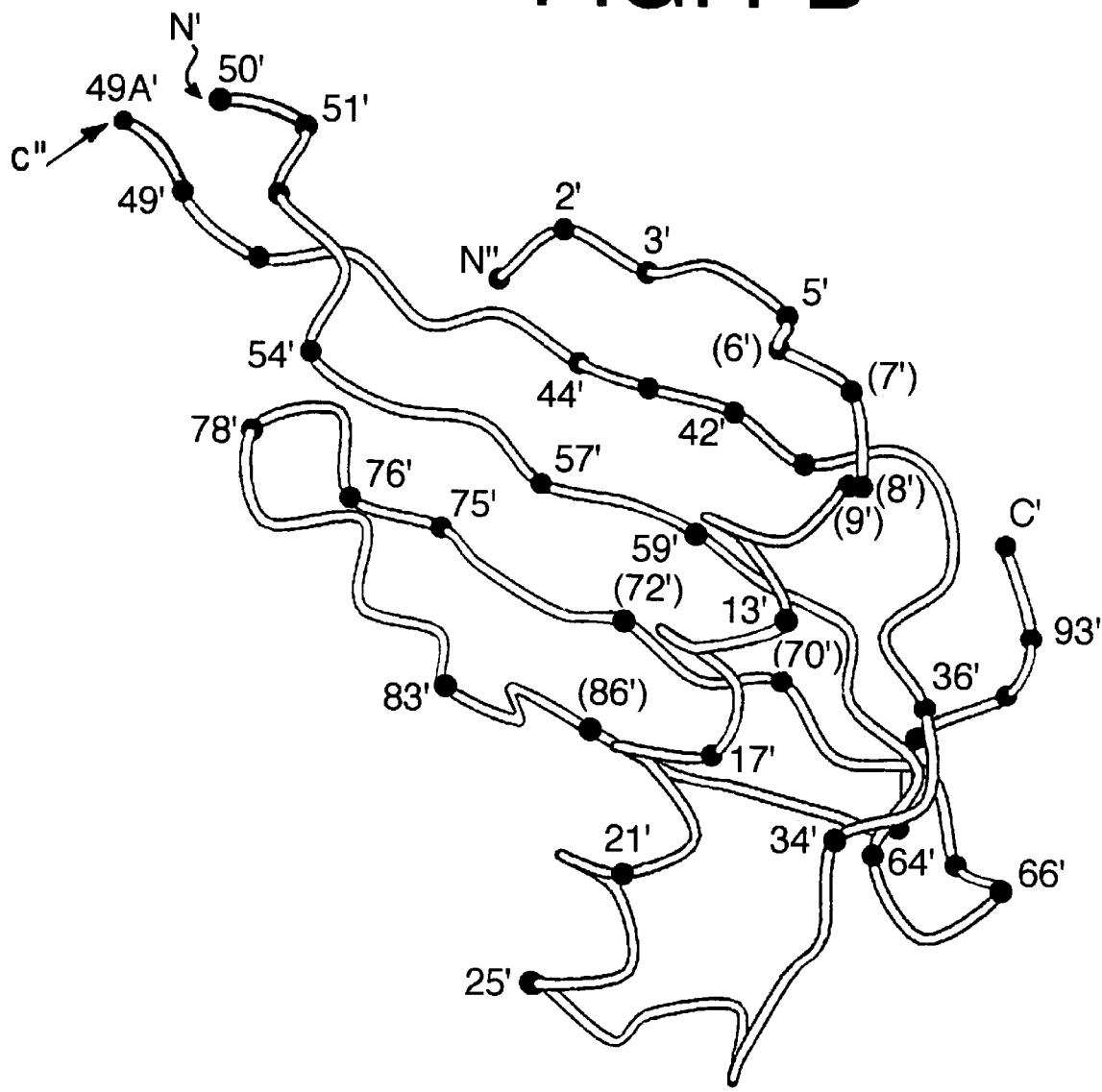
FIG.4-B

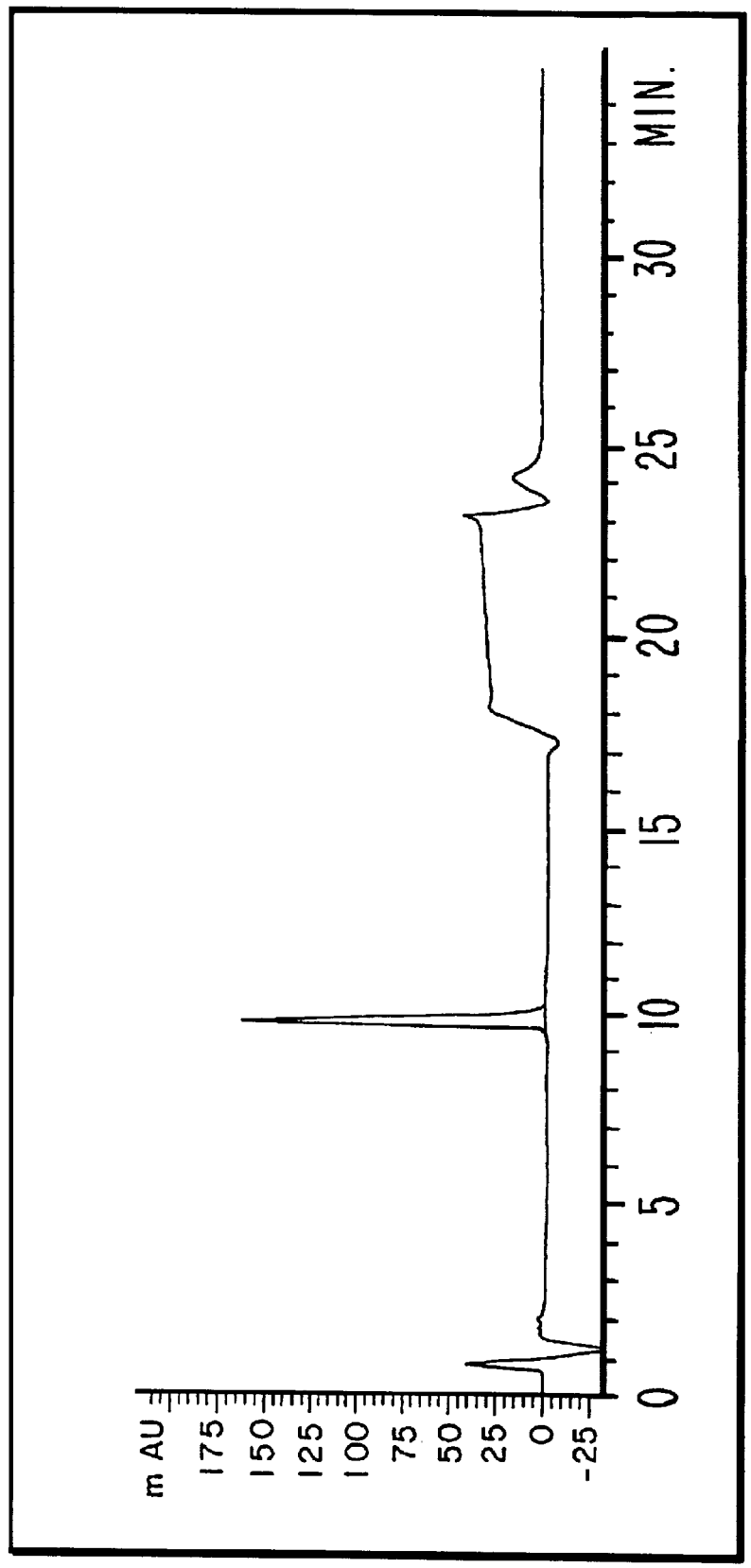

FRUIT LIQUEUR BEVERAGE CONTAINING RECOMBINANT MONELLIN TO ENHANCE THE ALCOHOLIC IMPACT

RELATED CO-PENDING PATENT APPLICATIONS

This application claims the benefit of U.S. Provisional Specification, Ser. No. 60/022,597 filed on Jul. 25, 1996, entitled: "USE OF MONELLIN IN ENHANCING THE ORGANOLEPTIC PROPERTIES OF BEVERAGES AND FOODSTUFFS". Benefit of said Specification, Ser. No. 60/022,597 is hereby claimed under 35 U.S.C. §119(e).

BACKGROUND OF THE INVENTION

Our invention provides food and beverage flavor formulations containing both plant-derived and recombinant monellin derivatives and analogues thereof.

Various flavor formulations containing both natural and synthetic materials such as chocolate flavors, fruit flavors, various flavors used to augment or enhance the aroma and taste of alcoholic beverages, and mint flavors lack impact on dilution and have unpleasant aftertastes such as metallic aftertaste, acid aftertaste and bitter aftertaste. Such aftertastes are enhanced when using various artificial sweeteners such as the various types of thaumatin.

Accordingly, a need has arisen to create flavor enhancement of foodstuffs and beverages containing such flavor nuances. Furthermore, a need has arisen to create enhancement of such flavors for foodstuffs and beverages which also contain artificial sweeteners such as thaumatin; and particularly, alcohol-containing beverages, such as cordials, and low-fat peanut butter.

U.S. Pat. Nos. 5,478,923 issued on Dec. 26, 1995; 5,264,558 issued on Nov. 23, 1993 and 5,487,983 issued on Jan. 30, 1996 describe single-chain monellin analogues as low calorie, protein sweeteners as well as expression systems for making such single-chain monellin analogues. Nothing in these patents, however, discloses the utilization of such single-chain monellin analogues for augmenting or enhancing the aroma or taste of foodstuffs and beverages which contain high percentages of alcohol or which contain high percentages of alcohol in combination with artificial sweeteners such as thaumatin.

U.S. Pat. No. 4,412,984 issued on Nov. 1, 1983 discloses flavored oral compositions containing thaumatin or monellin at a flavor potentiating level which level is below the sweetness threshold of thaumatin or monellin, respectively, in the composition. U.S. Pat. No. 4,412,984 further discloses a flavoring composition comprising a solution or dispersion of a flavoring agent in a carrier therefor and also contains thaumatin or monellin at a flavor potentiating level which level is below the level required to provide sweetness in a substrate when a flavoring composition is added thereto in a flavoring amount. In Example I at columns 2 and 3 of U.S. Pat. No. 4,412,984, a formulation containing 10% by weight glycerol, 10% ethanol, 0.05% cetyl pyridinium chloride, 0.066% cinnamon and mint flavor, 0.005 to 0.01% saccharin, 0.0001% thaumatin and water (up to 100%) is disclosed. The effects of using single-chain monellin analogues or natural monellin in place of the thaumatin or in addition to the thaumatin in such formulations containing ethyl alcohol is not recognized in U.S. Pat. No. 4,412,984.

Furthermore, U.S. Pat. No. 5,366,747 issued on Nov. 22, 1994 discloses the use of succinic acid taken alone or taken further together with sclareolide in enhancing the organoleptic properties of foodstuffs. Nothing is set forth in U.S. Pat. No. 5,366,747 concerning the combination of such succinic acid taken alone or further together with sclareolide in combination with either the single-chain monellin analogues of our invention or with natural monellin.

U.S. Pat. No. 4,999,207 issued on Mar. 12, 1991 discloses the improvement on the taste of foodstuffs especially having a sweet aftertaste and an astringent and other unpleasant aftertastes by means of the addition of sclareolide thereto. Although thaumatin is mentioned at column 8, line 28 of U.S. Pat. No. 4,999,207, the specific impact of single-chain monellin analogues or natural monellin on the depression of such aftertastes is neither set forth nor is it implied in said U.S. Pat. No. 4,999,207.

In general, nothing in the prior art discloses the use of single-chain monellin analogues or natural monellin or its analogues in augmenting or enhancing the aroma or taste of ethyl alcohol-containing beverages and foodstuffs, particularly when such ethyl alcohol-containing beverages or foodstuffs also contain thaumatin or succinic acid or sclareolide.

BRIEF DESCRIPTION OF THE DRAWINGS

FIG. 1 shows the amino acid sequence of the A- and B-chains of the natural monellin protein.

FIG. 2 is a representation of the three-dimensional conformation of the natural, native monellin protein.

FIG. 3A shows the amino acid sequence of a single-chain monellin protein analogue prepared according to the process of U.S. Pat. No. 5,487,983, and the nucleotide sequence of a synthetic gene useful in synthesizing the single-chain monellin protein.

FIG. 3B(i) shows the amino acid sequence (leaving room for substitution at position 51 using the symbol "Xaa") of Japanese Published Application No. JP05/070494 (abstracted at *Chemical Abstracts,* Volume 119:48069g, entitled "Single-stranded monellins for improved thermostability", the contents of which abstract are incorporated herein by reference. The symbol "Xaa" represents either of glycine, serine, glutamic acid or threonine.

FIG. 3B(ii) shows the amino acid sequence of a complete single-chain monellin protein of Published Japanese Application No. JP05/070494 abstracted at *Chemical Abstracts,* Volume 119:48069g.

FIG. 4A sets forth the α-carbon trace of the backbone of a single-chain monellin produced according to the process of U.S. Pat. No. 5,487,983 issued on Jan. 30, 1996 with dots at the α-carbon positions of residues that have been probed by mutagenesis.

FIG. 4B sets forth the α-carbon trace of the backbones of natural monellin with dots at the α-carbon positions of residues that have been probed by mutagenesis.

FIG. 6 is the high pressure liquid chromatography profile for the same TALIN® as set forth concerning the brief description of FIG. 5.

DETAILED DESCRIPTION OF THE DRAWINGS

Figure 5:
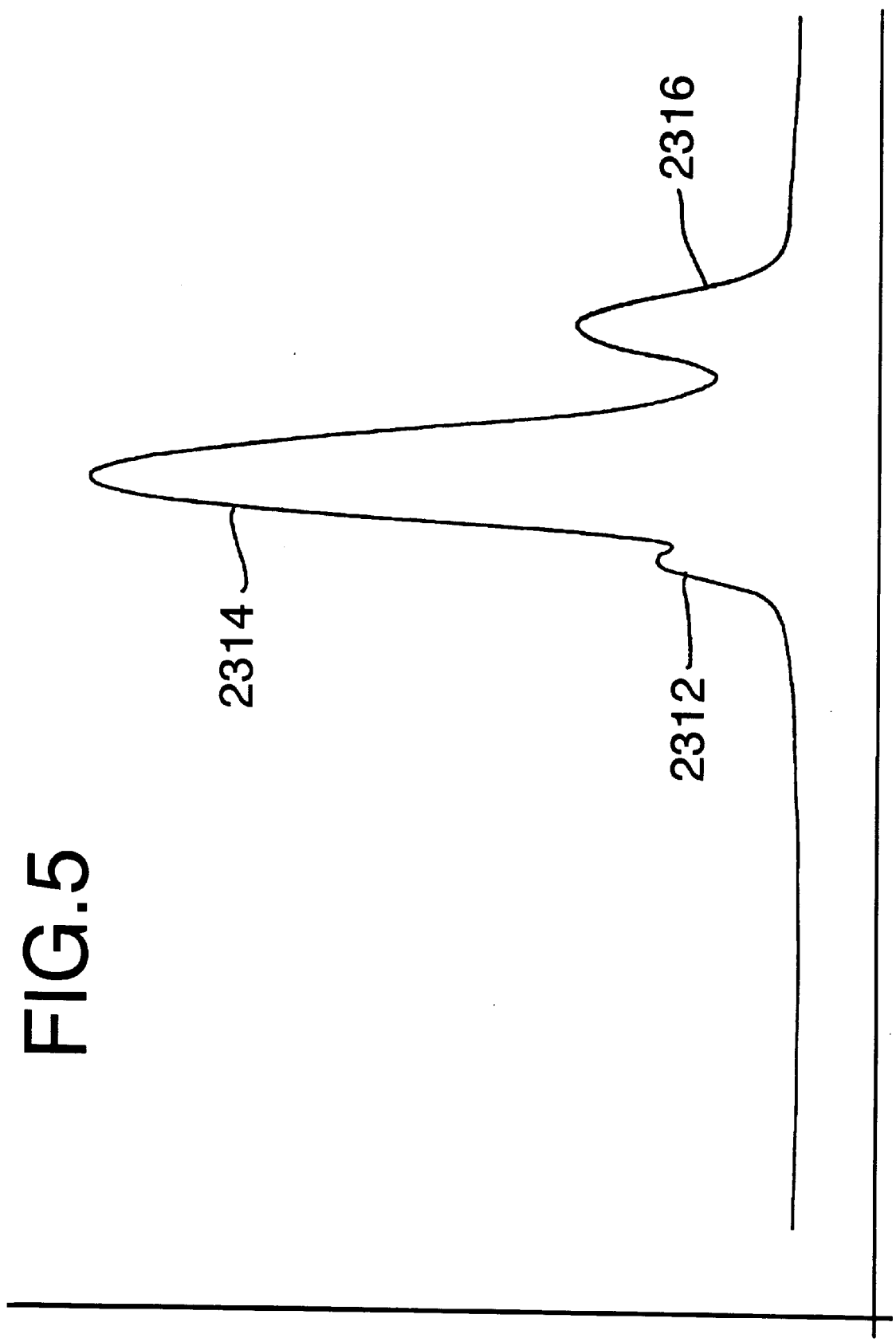
FIG. 5 is a liquid chromatogram profile for TALIN® (trademark of Tate and Lyle Limited of the United Kingdom), a mixture of Thaumatin I, Thaumatin II and Thaumatin B (conditions: S-Sepharose column operating at 7 ml per minute; gradient: 0–25 mM NaCl (2×750 ml); fraction size: 45 ml).

As stated at column 9, line 12 of U.S. Pat. No. 5,487,983, the protein of the amino acid sequence shown in FIG. 3A is encoded by a DNA sequence as-they are shown (Sequence ID NO. 37. As shown in FIG. 3A, nucleotides 1–141 encode residues 1–45 of the native B-chain preceded by a MET encoding ATG start codon, nucleotides 142–165 encode the linking "C" portion of eight amino acids, and nucleotides 166–285 encode residues 6–45 of the native A protein.

The protein of the monellin amino acid sequence shown in FIG. 3B(ii), is also encoded by a DNA sequence as thereshown (Sequence ID NO. 38). As shown in FIG. 3B(ii), the nucleotides shown thereon encode residues 1–95 of the single-chain preceded by a MET encoding ATG start codon. The amino acid sequence of FIG. 3B(ii) is a replication of the amino acid sequence of FIG. 3B(i) whereat at position 51, "Xaa" is replaced by a glycine ("Gly") moiety. As stated, supra, the "Xaa" protein at position 51 can be either a glycine, a serine, a glutamic acid or a threonine moiety and is produced according to the procedure of Japanese Published Application No. JP05/070494 abstracted at Chemical Abstracts, Volume 119:48069g, which abstract is set forth as follows:

119: 48069 g Single-stranded monellins for improved thermos=tability. Iijima, Hiroshi; Sone, Hidetaka (Kirin Brewery) Jpn. Kokai Tokkyo Koho JP 05 70,494 [93 70,494] (Cl. C07K7/10), Mar. 23, 1993, JP Appl. 90/196,983, Jul. 25, 1990; 29 pp. The single-stranded (ss) monellins (I) retain the sweetness of the wild type two-stranded I and have enhanced thermostability, esp. in lower pH, and protease resistance. The ss-I are prepd. by linking the C-terminus of B chain of I with the N-terminal Phe of A chain with a linker amino acid Xaa (Xaa=Gly, Ser, Glu, or Thr). Prepn. of a ss-I using Gly as the linker amino acid by expression of the synthetic gene in *Escherichia coii* and *Saccharomyces cerevisiae* was shown. The ss-I retained its sweetness after incubation for 20 mins at 100°, but the wild type lost its sweetness at 50°. Moreover, the ss-I but not the wild type counterpart was resistant to proteinase degrdn. with e.g. *Achromobacter proteinase* I. Replacing the $Val_{12}$ or $Val_{37}$ of the ss-I with Ala did not alter the thermostability and protease resistance.

Referring to FIG. 4A, the α-carbon trace of the backbone of single-chain monellin, the numbered dots at the α-carbon positions of residues that have been probed by mutagensis correspond precisely to the numbers set forth for the amino acid sequence in FIG. 3A with "N" corresponding to a methionine moiety, the number "2" being a glycine moiety, the number "3" being a glutamic acid moiety, the number "5" being a glutamic acid moiety, the number "6" being an isoleucine moiety, the number "7" being an isoleucine moiety, the number "8" being an aspartic acid moiety, the number "9" being an isoleucine moiety, the number "13" being a threonine moiety, the number "17" being a glycine moiety, the number "21" being a valine moiety, the number "25" being an asparagine moiety, the number "34" being a threonine moiety, the number "36" being an asparagine moiety, the number "42" being a cysteine moiety, the number "44" being a lysine moiety, the number "50" being an asparagine moiety, the number "54" being an isoleucine moiety, the number "57" being a tyrosine moiety, the number "59" being a tyrosine moiety, the number "64" being a tyrosine moiety, the number "66" being a serine moiety, the number "70" being a phenyl alanine moiety, the number "72" being an alanine moiety, the number "75" being a serine moiety, the number "76" being a glutamic acid moiety, the number "78" being a tyrosine moiety, the number "83" being an arginine moiety, the number "86" being a leucine moiety, the number "93" being a proline moiety; and the terminal, "C" being a proline moiety.

FIG. 4B sets forth an α-carbon trace of the backbones of the natural monellin protein with dots at the α-carbon positions of the residues that have been probed by mutagenesis for each of two strands, a first strand beginning with N' and ending at C' and the second strand beginning at N" and ending at C". The strand beginning at N' and ending at C' corresponds to the B-chain of FIG. 1 (Sequence ID NO. 2). The strand beginning at N" and ending at C" corresponds to the A-chain of FIG. 1 (Sequence ID NO. 1).

With reference to the "A-chain", beginning at N" and ending at C", the dot indicated by N" is for methionine. Reference numeral 2' represents the moiety glycine. Reference numeral 3' represents the moiety glutamic acid. Reference numeral 5' represents the moiety glutamic acid. Reference numeral 6' represents the isoleucine moiety. Reference numeral 7' represents the isoleucine moiety. Reference numeral 8' represents the aspartic acid moiety. Reference numeral 9' represents the isoleucine moiety. Reference numeral 13' represents the threonine moiety. Reference numeral 17' represents the glycine moiety. Reference numeral 21' represents the valine moiety. Reference numeral 25' represents the asparagine moiety. Reference numeral 34' represents the threonine moiety. Reference numeral 36' represents the asparagine moiety. Reference numeral 42' represents the cysteine moiety. Reference numeral 44' represents the lysine moiety. Reference numeral 49' represents the glutamic acid moiety. Reference numeral 49A' which corresponds to the end of the chain at C" represents phenyl alanine.

With respect to chain-B, reference numeral 50' which corresponds to the beginning of the chain at N' represents arginine. Reference numeral 51' represents a glutamic acid moiety. Reference 54' represents an isoleucine moiety. Reference numeral 57' represents a tyrosine moiety. Reference numeral 59' represents a tyrosine moiety. Reference numeral 64' represents a tyrosine moiety. Reference numeral 66' represents a serine moiety. Reference numeral 70' represents a phenyl alanine moiety. Reference numeral 72' represents an alanine moiety. Reference numeral 75' represents a serine moiety. Reference numberal 76' represents a glutamic acid moiety. Reference numeral 78' represents a tyrosine moiety. Reference numeral 83' represents an arginine moiety. Reference numeral 86' represents a leucine moiety. Reference numeral 93' represents a proline moiety. The end of the chain, C', is a proline moiety.

FIG. 5 is a liquid chromatogram profile for TALIN® (trademark of Tate and Lyle Limited of the United Kingdom), a mixture of Thaumatin I (Sequence ID NO. 35), Thaumatin II (Sequence ID NO. 54) and Thaumatin B (conditions: S-Sepharose column operating at 7 ml per minute; gradient: 0–25 mM NaCl (2×750 ml); fraction size: 45 ml). The peak indicated by reference numeral 2316 is for that part of TALIN® which is known as "Thaumatin I" as described in U.S. Pat. No. 5,221,624 issued on Jun. 22, 1993, the specification for which is incorporated by reference herein. The Thaumatin I can also be shown using the symbolism: $[Lys^{46}, Asp^{113}, Asp^{137}]$ where "Lys" stands for "lysine" moiety; and "Asp" stands for an "Aspartic acid" moiety. The peaks indicated by reference numerals 2312 and 2314 are for "Thaumatin B" and "Thaumatin II" as described in U.S. Pat. No. 4,771,000, the specification for which is incorporated by reference herein.

THE INVENTION

Our invention is directed to fermentation-derived beverages and distilled spirits which are consumable or ingestible and which comprise:

(i) from 1.5% up to 70% by weight of an alcohol or ester selected from the group consisting of ethyl alcohol, isoamyl alcohol, n-hexanol, L-menthol and cis-3-hexenyl acetate;

(ii) from 0.5 parts per million (ppm) up to 15 ppm of monellin or an analogue thereof; and (iii) from about 0.1 parts per billion (ppb) up to about 2% by weight of a fermentation-derived beverage flavorant or distilled spirit flavorant.

Our invention is also directed to a process for augmenting or enhancing the aroma and/or taste of a fermentation-derived beverage or distilled spirit comprising the step of adding to a fermentation-derived beverage or distilled spirit from 0.5 ppm up to 15 ppm of monellin or an analogue thereof.

Our invention is also directed to monellin (or an analogue thereof) containing flavorants containing from about 0.5 up to about 15 ppm of monellin or an analogue thereof and from about 0.01 up to about 200 ppm of at least one flavorant selected from the group consisting of:

isobutyl thiazole;
trimethyl pyrazine;
2-methoxy-3-isobutyl pyrazine;
menthol;
isopulegol;
trans-2-hexenol;
6-methyl-5-hepten-2-one;
methyl acetophenone;
vanilla;
vanillin;
3-methyl-2-buten-1-ol;
a mixture of 3-methyl-2-buten-1-ol and ethyl acetate;
a mixture of 3-methyl-2-buten-1-ol, ethyl acetate and CITRAL;
natural banana essence;
ethyl decanoate;
natural raspberry flavor essence in admixture with α-terpineol;
β-ionone;
bis(methylfuryl)disulfide;
farnesene;
germacrene;
ethyl pyruvate;
1,3,5-undecatriene; and
indole.

Our invention is also directed to monellin (or an analogue thereof) in admixture with peanut butter, preferably low-fat peanut butter.

As will be seen in the examples provided, infra, the monellin or analogue thereof has an extremely favorable flavor and mouthfeel impact upon the fermentation-derived beverage or distilled spirit. Examples of fermentation-derived beverages and distilled spirits are beer (both low alcohol beer, medium alcohol beer and high alcohol beer), wine, liqueurs; and hard liquors including vodka, rum, brandy, bourbon, Scotch whiskies and the like.

The term "monellin or an analogue thereof" can mean natural monellin protein such as that disclosed by Somoza, et al, in *J. Mol. Biol.* (1993), 234, pages 390–404, title "Two Crystal Structures of a Potently Sweet Protein/Natural Monellin at 2.75 Å Resolution and Single-Chain Monellin at 1.7 Å Resolution" defined according to FIGS. 1, 2 and 4B described, supra, or analogues thereof as set forth in the following list:

TABLE I

ANALOGUES OF NATIVE MONELLIN
Monellin Analogue

Native monellin of FIGS. 1, 2 (SEQ ID No. 1 and SEQ ID No. 2) and 4B
GluB49Asn, AsnB50Glu (SEQ ID No. 3)
AspA22Asn, GluA25Gln, AspA26Asn, GluB49Asn, AsnB50Glu (SEQ ID No. 3 and SEQ ID No. 4)
CysB41Ser (SEQ ID No. 5)
AspA22Asn (SEQ ID No. 6)
GluA25Gln (SEQ ID No. 7)
AspA26Asn (SEQ ID No. 8)
AspB7Asn (SEQ ID No. 9)
AspB7Abu (Abu = 1-α-aminobutyric acid) (SEQ ID No. 10)
AspB7Glu (SEQ ID No. 11)
AspB7Gly (SEQ ID No. 12)
AspB7D-Asp (SEQ ID No. 13)
IleB6Gly (SEQ ID No. 14)
IleB6Ala (SEQ ID No. 15)
IleB6D-Ala (SEQ ID No. 16)
IleB8Gly (SEQ ID No. 17)
IleB8Ala (SEQ ID No. 18)
IleB8Phe (SEQ ID No. 19)
IleB8D-Ala (SEQ ID No. 20)
TyrA13Gly (SEQ ID No. 21)
TyrA13Phe (SEQ ID No. 22)
GlyB9Ala (SEQ ID No. 23)
GlyB9D-Ala (SEQ ID No. 24)
LysA4Ahx (Ahx = 1-α-amino hexanoic acid) (SEQ ID No. 25)
LysA17Ahx (SEQ ID No. 26)
LysA28Ahx (SEQ ID No. 27)
LysA33Ahx (SEQ ID No. 28)
LysB17Ahx (SEQ ID No. 29)
LysB25Ahx (SEQ ID No. 30)
LysB36Ahx (SEQ ID No. 31)
GlnB13Ahx (SEQ ID No. 32)
LysB44Ahx (SEQ ID No. 33)
GlnB13Ahx, LysB25Ahx (SEQ ID No. 34)

In addition, the "monellin or an analogue thereof" of our invention can be a single-chain monellin or mutant thereof as set forth in FIG. 3A or FIG. 3B(ii) and prepared according to Published Japanese Application No. JP05/070494 (abstracted at Chemical Abstracts, Volume 119:48069g, thusly:

119: 48069 g Single-stranded monellins for improved thermos=tability. Iijima, Hiroshi; Sone, Hidetaka (Kirin Brewery) Jpn. Kokai Tokkyo Koho JP 05 70,494 [93 70,494] (Cl. C07K7/10), Mar. 23, 1993, JP Appl. 90/196,983, Jul. 25, 1990; 29 pp. The single-stranded (ss) monellins (I) retain the sweetness of the wild type two-stranded I and have enhanced thermostability, esp. in lower pH, and protease resistance. The ss-I are prepd. by linking the C-terminus of B chain of I with the N-terminal Phe of A chain with a linker amino acid Xaa (Xaa=Gly, Ser, Glu, or Thr). Prepn. of a ss-I using Gly as the linker amino acid by expression of the synthetic gene in *Escherichia coii* and *Saccharomyces cerevisiae* was shown. The ss-I retained its sweetness after incubation for 20 mins at 100°, but the wild type lost its sweetness at 50°. Moreover, the ss-I but not the wild type counterpart was resistant to proteinase degrdn. with e.g. *Achromobacter proteinase* I. Replacing the Val$_{12}$ or Val$_{37}$ of the ss-I with Ala did not alter the thermostability and protease resistance.

or according to the procedure of U.S. Pat. No. 5,478,923 issued on Dec. 26, 1995, the specification for which is incorporated by reference herein. The single-chain monellin sequence is set forth as sequence ID No. 36. Examples of mutants of single-chain monellin are as follows:

TABLE II

SINGLE-CHAIN MONELLIN MUTANTS

Single-chain monellin of FIG. 3A (SEQ ID No. 37)
Single-chain monellin of FIG. 3B (ii) (SEQ ID No. 38)
Lys43Glu (SEQ ID No. 39)
Arg70Glu (SEQ ID No. 40)
Lys17Cys, Phe34Cys (disulfide) (SEQ ID No. 41)
Lys44Cys, Glu57Cys (disulfide) (SEQ ID No. 42)
Lys44Gln, Glu48Gln, Glu50Gln, Arg57Gln, Glu52Gln, Lys54Gln (SEQ ID No. 43)
Gln59Cys, Asp72Cys, Cys41Ser (SEQ ID No. 44)
Phe34Asp (SEQ ID No. 45)
Gly1Met, Glu2Met (SEQ ID No. 46)
Glu59Cys (SEQ ID No. 47)
Cys41Ser (SEQ ID No. 48)
Met42Val (SEQ ID No. 49)
Trp3Thr, Ile5Glu, Met42Asn (SEQ ID No. 50)
Deletion of Pro94 (SEQ ID No. 51)
Deletion of Pro92 to Pro94 (SEQ ID No. 52)
Deletion of Pro90 to Pro94 (SEQ ID No. 53)

As stated above, the amount of monellin or analogue thereof may be used in the beverage at levels of from 0.05 ppm up to 15 ppm depending upon the nature of the beverage and the type of flavorant used. Indeed, good results are obtained as will be shown in the Examples, infra, at levels of 0.1 ppm with chocolate flavor using natural monellin or recombinant monellin. When used with cis-3-hexenyl acetate, levels of monellin or analogues thereof of from 3 and 5 ppm are useful. When used with liqueurs such as blueberry liqueur or Liqueur Perle de Brillet, levels of 10 ppm are useful.

In addition to the monellin or analogue thereof and flavor added to the alcoholic beverage composition, other materials have been found by us to be useful in augmenting or ,enhancing the aroma and taste of the fermentation-derived beverage or distilled spirit. These other materials are as follows:

(i) thaumatin, including Thaumatin I, (Sequence ID NO: 35), Thaumatin II, (Sequence ID NO: 54) Thaumatin B and mixtures thereof such as TALIN® (trademark of Tate and Lyle Limited of the United Kingdom);

(ii) succinic acid;

(iii) sclareolide having the structure:

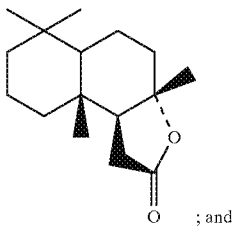

; and (iv) 2,5-dimethyl-4-hydroxy-3(2H)-furanone having the structure:

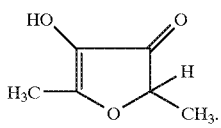

The amount of succinic acid that can be used can vary from 0.05 ppm up to 2%. The amount of sclareolide that can be used may vary from 0.05 ppm up to 2%. The amount of thaumatin that can be used may vary from 0.1 ppb up to about 15 ppm by weight of the fermentation-derived beverage or distilled spirit.

When thaumatin is used with the monellin or analogue thereof, it is preferable to use a ratio of thaumatin:monellin or analogue thereof of about 1:1. However, for the purposes of our invention, a ratio of from about 0.05 parts monellin:1 part thaumatin up to 1 part thaumatin:0.05 parts monellin is within the scope of our invention.

The following examples are given to illustrate embodiments of the invention as it is preferred to practice it. It will be understood that these examples are illustrative and the invention is not to be considered as restricted thereto except as indicated in the appended claims.

EXAMPLE I

Example I(A)

Chocolate Flavor Formulation

The following formulation is prepared:

"AAA COMPOSITION"

| Ingredients | Parts by Weight |
|---|---|
| Sclareolide | 50 |
| Caryophyllene beta | 50 |
| 5-Methyl-2-phenyl-2-hexanal | 130 |
| Isovaleric acid | 25 |
| Phenyl acetaldehyde | 80 |
| Phenyl ethyl acetate | 10 |
| Geranyl acetate | 30 |
| Linalool | 150 |
| Furaneol 15% | 240 |
| 2-Ethyl-3-methyl pyrazine | 0.4 |
| 2-Ethyl-5-methyl pyrazine | 0.1 |
| 2,3,5-Trimethyl pyrazine | 0.4 |
| Propylene glycol | 234.1 |
| Total: | 1,000 |

COMPARISONS

| Water | Natural Monellin (1 ppm) of FIGS. 1, 2, (SEQ ID NO. 1 and SEQ ID NO. 2) and 4B | Recombinant Monellin of FIG. 4A (SEQ ID NO. 36) (1 ppm) |
|---|---|---|
| AAA 1 ppm: Typical AAA (chocolate) note. | AAA 1 ppm: Typical AAA chocolate note with a larger mouthfeel. There is also a metallic/acid aftertaste in the back. The monellin seems to boost this type of aftertaste. Ranking (on a scale of 1–10 with 10 being the best): 7/10 | AAA 1 ppm: Typical AAA chocolate note, but here the metallic/acid aftertaste is reduced. Ranking (on a scale of 1–10 with 10 being the best): 9/10 |

The water has now been replaced with filtered water in order to reduce the metallic/acid aftertaste and the results are as follows:

| Water | Monellin (1 ppm) | Recombinant Monellin of FIG. 4A (1 ppm) |
|---|---|---|
| AAA 1 ppm: Typical AAA note with a | AAA 1 ppm: Typical AAA note with a move | AAA 1 ppm: Typical AAA note, but no |

| Water | Monellin (1 ppm) | Recombinant Monellin of FIG. 4A (1 ppm) |
|---|---|---|
| bitter/acid aggression on the back of the tongue. | of the bitter/acid impact to the front of the tongue. Ranking (on a scale of 1–10 with 10 being the best): 6/10 | more aggresivity of the bitter/acid impact. Something full which is filling up the mouth with a coating effect on the tongue. Ranking (on a scale of 1–10 with 10 being the best): 9/10 |

The chocolate flavor of Example IA is now used at a level of 0.1 ppm in 70% aqueous ethyl alcohol:

| Water | Natural Monellin (1 ppm) of FIGS. 1, 2 and 4B | Recombinant Monellin of FIG. 3B (ii) (1 ppm) |
|---|---|---|
| AAA 0.1 ppm (10 drops of alcohol solution): Typical AAA note. | AAA 0.1 ppm (10 drops of ethanol solution): Typical AAA, no difference in the flavor but enhancement of ethyl alcohol traces. Ranking (on a scale of 1–10 with 10 being the best): 7/10 | AAA 1 ppm (10 drops of ethanol solution): Typical AAA note, but alcohol is stronger. Ranking (on a scale of 1–10 with 10 being the best): 8/10 |

EXAMPLE II

Example II(A)

The following mint flavor formulation is prepared:

| Ingredients | Parts by Weight |
|---|---|
| Sclareolide | 50 |
| Caryophyllene beta | 50 |
| Methanone | 50 |
| Limonene | 25 |
| Thymol | 20 |
| Eucalyptol | 10 |
| Terpineol 4 | 4 |
| Myrcene | 4 |
| para Cymene | 2 |
| gamma Terpinene | 2 |
| Peppermint oil | 783 |
| Total: | 1,000 |

Example II(B)

COMPARISONS

| Water | Natural Monellin (1 ppm) of FIGS. 1, 2 and 4B | Recombinant Monellin of FIG. 4A (1 ppm) |
|---|---|---|
| Mint flavor of Example II(A) (0.1 ppm): Typical mint flavor impact. | Mint flavor of Example II(A) at 0.1 ppm: Mint impact is depressed with ethyl alcohol impression covering the mint note. Ranking: 6/10 | Mint flavor of Example II(A) (1 ppm): Typical mint impact with a sweet alcohol note. The product is rounder. Ranking: 8/10 |

EXAMPLE III

Additional comparisons were carried out as follows:

| Water | Natural Monellin (10 ppm) of FIGS. 1, 2 and 4B | Recombinant Monellin of FIG. 3B(ii) (10 ppm) |
|---|---|---|
| AAA flavor of Example I(A) (0.5 ppm): Typical AAA (chocolate) note. | AAA flavor of Example I(A) (0.5 ppm): Typical AAA note with a depression of the floral chocolate impact. The sweet impact is instantaneous with no delay. Ranking: 8/10 | AAA flavor of Example I(A) (0.5 ppm): Typical AAA (chocolate) note; better flavor impact with alcohol impression. The sweet nuance is instantaneous, but with a small licorice aftertaste. Ranking: 9/10 |

| Water | Natural Monellin (10 ppm) of FIGS. 1, 2 and 4B | Recombinant Monellin of FIG. 4A (10 ppm) |
|---|---|---|
| Isoamyl alcohol (1 ppm): Typical isoamyl alcohol impression, fruity, winey. | Isoamyl alcohol (1 ppm): Typical, but we have a stronger isoamyl alcohol impact together with a sweet aftertaste. Ranking: 8/10 | Isoamyl alcohol (1 ppm): Typical, but much stronger isoamyl alcohol impact. Isoamyl alcohol is around your mouth with a coating impression. Ranking: 9/10 |
| Hexanol (1 ppm): Typical hexanol note with a green, skinny, fruity, winey note. | Hexanol (1 ppm): Typical stronger, winey hexanol note with a sweet aftertaste. Ranking: 8/10 | Hexanol (1 ppm): Typical, but much stronger with a vegetable, full, strong, green note with a sweet impact. Ranking: 9/10 |
| Hexanol (5 ppm): | Hexanol (5 ppm): | Hexanol (5 ppm): |

| | | |
|---|---|---|
| Typical hexanol note with a waxy, fatty, green beans note; the profile is flat. | Typical stronger with a dry impression of rum. Ranking: 7/10 | Typical, but much stronger with a nice, sweet impact. Ranking: 9/10 |
| Cis-3-hexenyl-acetate (5 ppm): Typical green, fruity, beany tea note. | Cis-3-hexenyl-acetate (5 ppm): Typical stronger with a more green, living note with a sweet impact. Ranking: 9/10 | Cis-3-hexenyl-acetate (5 ppm): Typical, but much stronger with a natural, full, strong, green note. The dosage is too strong. Ranking: 8/10 |
| Cis-3-hexenyl-acetate (3 ppm): Typical green, fruity, strawberry note. | Cis-3-hexenyl-acetate (3 ppm): Typical stronger with a more fresh green, living note. Ranking: 7/10 | Cis-3-hexenyl-acetate (3 ppm): Typical, but no more chemical impact. Ranking: 9/10 |
| L-Menthol (5 ppm): Typical green, fruity, strawberry note. | L-Menthol (5 ppm): Typical stronger with a more fresh green, living note. Ranking: 8/10 | L-Menthol (5 ppm): Typical stronger. Ranking: 9/10 |
| Citral (0.5 ppm): Typical citral, lemon note. | Citral (0.5 ppm): Depression of citral, lemon impact. Ranking: 4/10 | Citral (0.5 ppm): Depression of the typical citral note. Ranking: 4/10 |
| Citral (5 ppm): Typical citral, lemon note. | Citral (5 ppm): Very strong depression of the citral, lemon impact. Ranking: 4/10 | Citral (5 ppm): Very strong depression of the typical citral note. Ranking: 4/10 |
| Gamma decalactone (5 ppm): Typical butter lactone. | Gamma decalactone (5 ppm): Butter lactone with a pungent taste and with a linoleic taste. Ranking: 5/10 | Gamma decalactone (5 ppm): Butter lactone with a fruity impression. Ranking: 7/10 |
| Oxyphenylon (15 ppm): Sweet, warm, fruity raspberry, powdery taste. [Oxyphenylon has the structure: 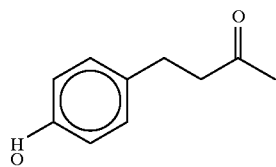 | Oxyphenylon (15 ppm): Boosting the raspberry flavor, but with a strong, soapy, powder note. Ranking: 4/10 | Oxyphenylon (15 ppm): Direct impact of oxyphenylon notes, but the soapy note is very strong?? Ranking: 3/10 |
| Acetaldehyde (5 ppm): Acetaldehyde impact. | Acetaldehyde (5 ppm): No working depressing the acetaldehyde impact. Ranking: 2/10 | Acetaldehyde (5 ppm): No working depressing the acetaldehyde impact. Ranking: 3/10 |
| Blueberry liquor (De Kuyper) | Blueberry liquor plus Natural Monellin (10 ppm) of FIGS. 1, 2 and 4B | Blueberry liquor plus Recombinant Monellin of FIG. 4A (10 ppm) |
| Standard product with blueberry flavor plus extract. | More fruity, more volatility; the alcohol impact is stronger. Ranking: 7/10 | The fruity impact is more ripe type, but the alcohol impact is very high. Ranking: 9/10 |

| | | | |
|---|---|---|---|
| Blueberry liquor (De Kuyper) | Blueberry liquor plus "Thaumatin" (TALIN ®) (0.5 ppm) | Blueberry liquor plus Natural Monellin (10 ppm) of FIGS. 1, 2 and 4B | Blueberry liquor plus Recombinant Monellin of FIG. 4A (10 ppm) |
| Standard product. | More natural fruit flavor; no action on the alcohol | Fruity with strong alcohol impact. Ranking: 7/10 | Fruity, but very strong alcohol impact. Ranking: 8/10 |

| | Liqueur Perle de Brillet plus "Thaumatin" (TALIN ®) (0.5 ppm) | Liquor Perle de Brillet plus Natural Monellin (10 ppm) of FIGS. 1, 2 and 4B | Liqueur Perle de Brillet plus Recombinant Monellin of FIG. 4A (10 ppm) |
|---|---|---|---|
| Liqueur Perle de Brillet 24° Alc | | | |
| Apple Pear type of flavor. | More natural fruit flavor; no action on the alcohol level. Ranking: 6/10 | More body; amyl alcohol and hexanol is higher with strong ethyl alcohol impact, 20% more. Ranking: 7/10 | Fruity, but very strong alcohol impact may be 20–25% stronger. Ranking: 8/10 |

| | Neutral liquor plus Natural Monellin (5 ppm) of FIGS. 1, 2 and 4B | Neutral liquor plus Recombinant Monellin of FIG. 4A (5 ppm) |
|---|---|---|
| Neutral liquor | | |
| Standard neutral product. | More fruity, more volatility; the alcohol impact is stronger. Ranking: 7/10 | The alcohol impact is very high. Ranking: 9/10 |

| | Liquor 12° brix 20% alcohol with Lemon flavor (40 ppm) plus Natural Monellin (5 ppm) of FIGS. 1, 2 and 4B | Liquor 12° brix 20% alcohol with Lemon flavor (40 ppm) plus "Thaumatin" (TALIN ®) (1 ppm) | Liquor 12° brix 20% alcohol with Lemon flavor (40 ppm) plus "Thaumatin" (TALIN ®) (1 ppm) plus Recombinant Monellin of FIG. 4A (1 ppm) |
|---|---|---|---|
| Liquor 12° brix 20% alcohol with Lemon flavor (40 ppm) | | | |
| Lemon impact. | Stronger ethyl alcohol impact, depression of the lemon impact. Ranking: 5/10 | The citrus impact is better, stronger, more natural, no impact on alcohol. Ranking: 6/10 | Nice citrus impact with a stronger alcohol impression. Ranking: 8/10 |

| Lemon Flavor | |
|---|---|
| Ingredients | Parts by Weight |
| Lemon essential oil | 13.0 |
| Citral | 2.0 |
| Cis-3-hexenyl acetate | 1.0 |
| Citric acid | 2.0 |

The "apple pear type of flavor" of the foregoing Example III contains the following ingredients and parts by weight:

| Pear Flavor | |
|---|---|
| Ingredients | Parts by Weight |
| Amyl acetate | 1,340.0 |
| Amyl valerate | 130.0 |
| Benzyl acetate (10% solution in 95% food grade ethyl alcohol) | 25.0 |
| Benzyl butyrate | 1.0 |
| Bergamot essential oil | 1.0 |
| n-Butyl acetate | 1.0 |
| Ethyl acetate | 80.0 |
| Ethyl butyrate | 13.0 |
| Ethyl decanoate | 2.0 |
| Ethyl heptylate | 2.0 |
| Ethyl hexylate | 1.0 |
| Ethyl octanoate | 2.0 |
| Geranyl propionate | 100.0 |
| Hexyl acetate | 2.0 |
| α-Ionone (1% solution in 95% food grade ethyl alcohol) | 1.0 |
| Isoamyl acetate | 1.0 |
| Isoamyl valerate | 1.0 |
| CITRAL ™ | 3.0 |
| Methyl acetate | 1.0 |
| Methyl heptenone | 1.0 |
| Orris resinoid (1% solution in 95% food grade ethyl alcohol) | 5.0 |
| Propyl acetate | 1.0 |
| Citronellol (1% solution in 95% food grade ethyl alcohol) | 1.0 |
| γ-Undecalactone | 1.0 |
| Vanillin | 5.0 |
| Propylene glycol | 279.0 |
| Total | 2,000.0 |

The blueberry flavor used in the foregoing Example III has the following formulation:

Blueberry Flavor

| Ingredients | Parts by Weight |
|---|---|
| Amyl acetate | 500.0 |
| Amyl butyrate | 15.0 |
| Anethol | 0.5 |
| Benzyl salicylate | 10.0 |
| Acetyl methyl carbinol | 8.0 |
| Dimethyl anthranilate | 1.0 |
| Ethyl acetate | 60.0 |
| Ethyl butyrate | 74.0 |
| Ethyl methylphenylglycidate | 20.0 |
| Ethyl succinate | 1.0 |
| Ethyl valerate | 1.0 |
| Geraniol | 13.0 |
| Hexanal | 1.0 |
| Cis-3-hexen-1-ol | 1.0 |
| 2-Hexenyl acetate | 1.0 |
| 2-Hexenyl butyrate | 1.0 |
| Hexyl butyrate | 1.0 |
| 4-(p-Hydroxyphenyl-2-butanone) | 16.0 |
| α-Ionone | 210.0 |
| Isobutyl cinnamate | 1.0 |
| Jasmine, absolute (10% solution in 95% food grade ethanol) | 7.0 |
| Lemon essential oil | 13.0 |
| Maltol | 3.0 |
| Methyl butyrate | 1.0 |
| Methyl capronate | 1.0 |
| Methyl disulfide | 1.0 |
| methyl p-naphthyl ketone | 1.0 |
| 50-50 Weight-weight mixture of orris resinoid and α-irone) | 60.5 |
| Rose, absolute | 10.0 |
| Terpenyl acetate | 1.0 |
| γ-Undecalactone | 10.0 |
| Ethyl vanillin | 86.0 |
| Propylene glycol | 870.0 |
| Total | 2,000.0 |

EXAMPLE IV

Flavorants and Peanut Butter Containing, in addition, Natur L Monellin

The following table sets forth various flavorants used at various levels in aqueous solutions of ethanol, their evaluations and the ranking of same on a scale of 1–5, with 5 being the best of the overall sensory perception value thereof when using 5 ppm of natural monellin of FIGS. 1, 2 (Sequence ID NO: 2) and 4B.

| Molecule | Molecule Concentration | Evaluation | Quality Ranking on a Scale of 1–5, with 5 Being the Best of Overall Sensory Perception Value |
|---|---|---|---|
| Natural dimethyl sulfide | 2 ppm (using a 1% solution) | The monellin decreases volatility, but causes a larger flavor impact. Also a "non-sugar" sweetness impact is created. | 2 |
| Ethyl acetate | 5 ppm (using a 1% solution) | No impact. | 0 |
| Ethyl acetate | 40 ppm (using a 10% solution) | The monellin increases the volatility together with the sweet perception. | 1 |
| Acetaldehyde | 5 ppm (using a 1% solution) | A higher, sweet impact; with no change in volatility. | 1 |
| Isobutyl thiazole (TOMATOZOLE ®) | 0.1 ppm (using a 0.1% solution) | The green vegetable tomato nuance impact is greatly increased. The natural tomato nuance is also improved. | 5 |
| Natural 2,5-dimethyl pyrazine | 1 ppm (using a 1% solution) | The pyrazine impact is increased. The naturalness of the product is increased. | 2 |
| Trimethyl pyrazine (TERRAZINE ® 001) | 1 ppm (using a 1% solution) | Pyrazine impact strengthened. | 3 |
| 2-Methoxy-3-isobutyl pyrazine (GALBAZINE ®) | 0.01 ppm (using a 0.1% solution) | Pyrazine note is enhanced with a more natural impact. The taste can be described as "extremely powerful, earthy, herbaceous, vegetable, green bell pepper flavor" having use levels in the finished consumer product of from 0.0001–0.05 ppm. | 3 |

-continued

| Molecule | Molecule Concentration | Evaluation | Quality Ranking on a Scale of 1–5, with 5 Being the Best of Overall Sensory Perception Value |
|---|---|---|---|
| Menthol | 20 ppm (using a 10% solution) | Freshness, effervescent effect and fresh impact is improved. | 4 |
| Trans-2-hexenal | 1 ppm (using a 1% solution) | A green, fruity, stronger aroma and taste with waxy nuances. | 1 |
| Trans-2-hexenal | 4 ppm (using a 1% solution) | A green aroma and taste with soapy nuance; but not "natural". | 1 |
| Natural isopulegol | 2 ppm (using a 1% solution) | A minty, cooling aroma with a larger perception of cooling on the tongue. | 3 |
| Natural isopulegol | 5 ppm (using a 1% solution) | The monellin causes a larger impact having a rounder flavor with a sweet, sugar background. | 3 |
| Trans-2-hexenol | 2 ppm (using a 1% solution) | The monellin causes a real increase of intensity, a fuller greater impact on the side of the tongue. | 4 |
| 6-Methyl-5-hepten-2-one | 1 ppm (using a 1% solution) | The monellin increases the power of the methyl heptenone giving it a more natural impact. | 4 |
| Methyl acetophenone | 2 ppm (using a 1% solution) | The monellin causes the product to be more natural and causes it to be a strong "living fruit" aroma and taste. | 5 |
| Vanilla extract | 200 ppm | The monellin causes the material to have a richer vanilla aroma, more creamy with a fuller impact. | 5 |
| Vanillin | 5 ppm (using a 1% solution) | A stronger impact with a sweet, sugar increase. | 4 |
| "Prenol" (3-methyl-2-buten-1-ol) | 0.1 ppm (using a 0.1% solution) | The monellin causes the prenol to have a greater volatility and a "third" dimension is given to the green, fruity nuance with a more natural impact. | 4 |
| "Prenol" (3-methyl-2-buten-1-ol) | 1 ppm (using a 1% solution) | The monellin gives a slight increase to the green, fruity aroma; but the best impact is at 0.1 ppm rather than at 1 ppm of prenol. | 2 |
| Mixture of 2 ppm Prenol and 10 ppm ethyl acetate | mixture (2 ppm and 10 ppm of each compound) | An enhanced, natural fruity note. | 4 |
| Mixture of 1 ppm prenol; 10 ppm ethyl acetate; and 5 ppm CITRAL | mixture (1 ppm prenol; 10 ppm ethyl acetate; and 5 ppm CITRAL) | The monellin gives to this mixture a greater lift and a real, fresh lemon juice nuance. | 5 |
| Peanut butter (reduced fat) | 0.1 ppm monellin in peanut butter | A natural, rich, fresh roast peanut nuance with diminished, bitter, salty, peanut skin nuance. | 4 |
| Peanut butter (reduced fat) | 1 ppm monellin | A natural, fresh roast peanut nuance with diminished, acid, salty, bitter impact. | 3 |
| Natural banana essence (produced via pervaporation) | 10 ppm (using a 10% solution) | The flavor impact is stronger with a more natural impression. | 3 |
| Peach essence (produced via pervaporation) | 10 ppm (using a 10% solution) | The ethyl decanoate note is boosted causing the impact to be a "fatty" impact. | 1 |
| Ethyl decanoate | 5 ppm (using a 1% solution) | The fatty, waxy impact is increased. | 4 |
| Raspberry | 10 ppm (using a | The impression of β-ionone | 5 |

| Molecule | Molecule Concentration | Evaluation | Quality Ranking on a Scale of 1–5, with 5 Being the Best of Overall Sensory Perception Value |
|---|---|---|---|
| essence (produced via pervaporation) (also containing 10% α-terpineol) | 10% solution) | is vastly reduced; causing a real improvement with a natural, fresh, warm, fruity note. | |
| β-Ionone | 3 ppm (using a 1% solution) | The monellin causes the ionone impact to be stronger and the chemical note is eliminated causing a real ripe, fresh, fruity, raspberry note to be created; cutting the floral impact and causing a natural fruit nuance to develop. | 5 |
| Bis(methylfuryl) disulfide | 0.04 ppm (using a 0.001% solution) | The monellin causes the product to have a fuller, more juicy flavor with a natural roasted meat impact. | 5 |
| Farnesene | 4 ppm (using a 1% solution) | The monellin causes the flavor impact to be natural. | 5 |
| Germacrene | 4 ppm (using a 1% solution) | The natural nuance is vastly increased. | 5 |
| Ethyl pyruvate | 5 ppm (using a 1% solution) | The natural impact is vastly increased. | 5 |
| 1,3,5-Undecatriene | 5 ppb (using a 0.001% solution) | The galbanum impact is vastly increased. | 5 |
| Natural indole | 0.5 ppm (using a 0.1% solution) | The chemical taste is eliminated and a natural honeysuckle, LIVING FLOWER aroma and taste nuance is created using the monellin. | 5 |

What is claimed is:

1. A fruit liqueur beverage comprising:
(i) from 20% up to 24% by weight of ethyl alcohol;
(ii) from 0.5 parts per million (ppm) up to 15 ppm of a recombinant single-strand monellin identified by sequence ID No. 36; and
(iii) from about 0.1 ppb up to about 2% by weight of a fruit liqueur flavorant composition, excluding said monellin.

2. The beverage of claim 1 wherein the fruit liqueur composition is selected from the group consisting of blueberry liqueur, apple/pear liqueur and lemon liqueur; and the fruit liqueur flavorant composition is selected from the group consisting of a blueberry flavor composition, a pear flavor composition and a lemon flavor composition.

3. The beverage of claim 2 wherein the fruit liqueur beverage is blueberry liqueur, and the fruit liqueur flavorant composition is a blueberry flavor composition.

4. The beverage of claim 2 wherein the fruit liqueur beverage is apple/pear liqueur, and the fruit liqueur flavorant composition is a pear flavor composition.

5. The beverage of claim 2 wherein the fruit liqueur beverage is lemon liqueur, and the fruit liqueur flavorant composition is a lemon flavor composition.

6. The beverage of claim 1 wherein the concentration of the recombinant single-strand monellin is 10 ppm.

7. The composition of claim 1, also containing from 0.05 ppm up to 2% by weight of succinic acid.

8. The composition of claim 1, also containing from 0.05 ppm up to 2% by weight of sclareolide.

9. The composition of claim 1, also containing from 0.1 ppb up to 15 ppm of thaumatin.

10. The composition of claim 9 wherein the thaumatin is selected from the group consisting of sequence ID No. 35 and sequence ID No. 54.

* * * * *

SEQUENCE LISTING

<160> NUMBER OF SEQ ID NOS: 54

<210> SEQ ID NO 1
<211> LENGTH: 45
<212> TYPE: PRT
<213> ORGANISM: Dioscoreophyllum cumminsii
<300> PUBLICATION INFORMATION:
<301> AUTHORS: Kim, Sung-Hou
    Cho, Joong M.
<302> TITLE: SINGLE-CHAIN MONELLIN ANALOG AS A LOW CALORIE PROTEIN
    SWEETNER
<308> DATABASE ACCESSION NUMBER: US005478923A
<310> PATENT DOCUMENT NUMBER: 5,478,923
<311> PATENT FILING DATE: 1994-03-25
<312> PUBLICATION DATE: 1995-12-26
<313> RELEVANT RESIDUES: 1 TO 45

<400> SEQUENCE: 1

Phe Arg Glu Ile Lys Gly Tyr Glu Tyr Gln Leu Tyr Val Tyr Ala Ser
 1               5                  10                  15

Asp Lys Leu Phe Arg Ala Asp Ile Ser Glu Asp Tyr Lys Thr Arg Gly
            20                  25                  30

Arg Lys Leu Leu Arg Phe Asn Gly Pro Val Pro Pro Pro
        35                  40                  45

<210> SEQ ID NO 2

-continued

```
<211> LENGTH: 50
<212> TYPE: PRT
<213> ORGANISM: Dioscoreophyllum cumminsii
<300> PUBLICATION INFORMATION:
<301> AUTHORS: Kim, Sung-Hou
      Cho, Joong M.
<302> TITLE: SINGLE-CHAIN MONELLIN ANALOG AS A LOW CALORIE PROTEIN
      SWEETNER
<308> DATABASE ACCESSION NUMBER: US005478923A
<310> PATENT DOCUMENT NUMBER: 5,478,923
<311> PATENT FILING DATE: 1994-03-25
<312> PUBLICATION DATE: 1995-12-26
<313> RELEVANT RESIDUES: 1 TO 45

<400> SEQUENCE: 2

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Asn Glu
    50

<210> SEQ ID NO 3
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<301> AUTHORS: Somoza, John R.
      Cho, Joong M.
      Kim, Sung-Hou
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 3

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Glu Asn
    50

<210> SEQ ID NO 4
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<301> AUTHORS: Somoza, John R.
      Cho, Joong M.
      Kim, Sung-Hou
<302> TITLE: The Taste-active Regions of Monellin, a Potently Sweet
      Protein.
<303> JOURNAL: Chemical Senses Journal
<304> VOLUME: 20
<306> PAGES: 61-68
```

<307> DATE: 1995

<400> SEQUENCE: 4

Phe Arg Glu Ile Lys Gly Tyr Glu Tyr Gln Leu Tyr Val Tyr Ala Ser
 1               5                  10                  15

Asp Lys Leu Phe Arg Ala Asn Ile Ser Gln Asn Tyr Lys Thr Arg Gly
             20                  25                  30

Arg Lys Leu Leu Arg Phe Asn Gly Pro Val Pro Pro Pro
         35                  40                  45

<210> SEQ ID NO 5
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 5

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
             20                  25                  30

Thr Phe Asn Lys Val Ile Arg Pro Ser Met Lys Lys Thr Ile Tyr Glu
         35                  40                  45

Asn Glu
     50

<210> SEQ ID NO 6
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 6

Phe Arg Glu Ile Lys Gly Tyr Glu Tyr Gln Leu Tyr Val Tyr Ala Ser
 1               5                  10                  15

Asp Lys Leu Phe Arg Ala Asn Ile Ser Glu Asp Tyr Lys Thr Arg Gly
             20                  25                  30

Arg Lys Leu Leu Arg Phe Asn Gly Pro Val Pro Pro Pro
         35                  40                  45

<210> SEQ ID NO 7
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal

```
        20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 7

Phe Arg Glu Ile Lys Gly Tyr Glu Tyr Gln Leu Tyr Val Tyr Ala Ser
 1               5                  10                  15

Asp Lys Leu Phe Arg Ala Asp Ile Ser Gln Asp Tyr Lys Thr Arg Gly
            20                  25                  30

Arg Lys Leu Leu Arg Phe Asn Gly Pro Val Pro Pro Pro
        35                  40                  45

<210> SEQ ID NO 8
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 8

Phe Arg Glu Ile Lys Gly Tyr Glu Tyr Gln Leu Tyr Val Tyr Ala Ser
 1               5                  10                  15

Asp Lys Leu Phe Arg Ala Asp Ile Ser Glu Asn Tyr Lys Thr Arg Gly
            20                  25                  30

Arg Lys Leu Leu Arg Phe Asn Gly Pro Val Pro Pro Pro
        35                  40                  45

<210> SEQ ID NO 9
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 9

Gly Glu Trp Glu Ile Ile Asn Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50
```

```
<210> SEQ ID NO 10
<211> LENGTH: 50
<212> TYPE: PRT
<213> ORGANISM: Artificial Sequence
<220> FEATURE:
<221> NAME/KEY: MOD_RES
<222> LOCATION: (7)
<223> OTHER INFORMATION: Xaa =  Abu = 2-aminobutyric acid
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 10

Gly Glu Trp Glu Ile Ile Xaa Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
     50

<210> SEQ ID NO 11
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 11

Gly Glu Trp Glu Ile Ile Glu Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
     50

<210> SEQ ID NO 12
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
```

<400> SEQUENCE: 12

Gly Glu Trp Glu Ile Ile Gly Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50

<210> SEQ ID NO 13
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (7)
<223> OTHER INFORMATION: Xaa = D-aspartic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 13

Gly Glu Trp Glu Ile Ile Xaa Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50

<210> SEQ ID NO 14
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 14

Gly Glu Trp Glu Ile Gly Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu

50

<210> SEQ ID NO 15
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 15

Gly Glu Trp Glu Ile Ala Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Asn Glu
    50

<210> SEQ ID NO 16
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (6)
<223> OTHER INFORMATION: Xaa = D-alanine
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 16

Gly Glu Trp Glu Ile Xaa Asp Ile Gly Pro Phe Thr Gln His Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Asn Glu
    50

<210> SEQ ID NO 17
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.

```
<303> JOURNAL: Chemical Senses Journal
<304> VOLUME: 20
<306> PAGES: 61-68
<307> DATE: 1995

<400> SEQUENCE: 17

Gly Glu Trp Glu Ile Ile Asp Gly Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50

<210> SEQ ID NO 18
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 18

Gly Glu Trp Glu Ile Ile Asp Ala Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50

<210> SEQ ID NO 19
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 19

Gly Glu Trp Glu Ile Ile Asp Phe Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50
```

```
<210> SEQ ID NO 20
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (8)
<223> OTHER INFORMATION: Xaa = D-alanine
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 20

Gly Glu Trp Glu Ile Ile Asp Xaa Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Asn Glu
    50

<210> SEQ ID NO 21
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 21

Phe Arg Glu Ile Lys Gly Tyr Glu Tyr Gln Leu Tyr Val Gly Ala Ser
 1               5                  10                  15

Asp Lys Leu Phe Arg Ala Asp Ile Ser Glu Asp Tyr Lys Thr Arg Gly
                20                  25                  30

Arg Lys Leu Leu Arg Phe Asn Gly Pro Val Pro Pro Pro
            35                  40                  45

<210> SEQ ID NO 22
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995
```

```
<400> SEQUENCE: 22

Phe Arg Glu Ile Lys Gly Tyr Glu Tyr Gln Leu Tyr Val Phe Ala Ser
  1               5                  10                  15

Asp Lys Leu Phe Arg Ala Asp Ile Ser Glu Asp Tyr Lys Thr Arg Gly
                 20                  25                  30

Arg Lys Leu Leu Arg Phe Asn Gly Pro Val Pro Pro Pro
            35                  40              45

<210> SEQ ID NO 23
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 23

Gly Glu Trp Glu Ile Ile Asp Ile Ala Pro Phe Thr Gln Asn Leu Gly
  1               5                  10                  15

Lys Phe Ala Val Asp Glu Glu Asn Lys Ile Gly Gln Tyr Gly Arg Leu
                 20                  25                  30

Thr Phe Asn Lys Val Ile Arg Pro Cys Met Lys Lys Thr Ile Tyr Glu
            35                  40                  45

Asn Glu
     50

<210> SEQ ID NO 24
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (9)
<223> OTHER INFORMATION: Xaa = D=alanine
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 24

Gly Glu Trp Glu Ile Ile Asp Ile Xaa Pro Phe Thr Gln Asn Leu Gly
  1               5                  10                  15

Lys Phe Ala Val Asp Glu Glu Asn Lys Ile Gly Gln Tyr Gly Arg Leu
                 20                  25                  30

Thr Phe Asn Lys Val Ile Arg Pro Cys Met Lys Lys Thr Ile Tyr Glu
            35                  40                  45

Asn Glu
     50

<210> SEQ ID NO 25
```

<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (5)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 25

Phe Arg Glu Ile Xaa Gly Tyr Glu Tyr Gln Leu Tyr Val Tyr Ala Ser
 1               5                  10                  15

Asp Lys Leu Phe Arg Ala Asp Ile Ser Glu Asp Tyr Lys Thr Arg Gly
            20                  25                  30

Arg Lys Leu Leu Arg Phe Asn Gly Pro Val Pro Pro Pro
        35                  40                  45

<210> SEQ ID NO 26
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (18)
<223> OTHER INFORMATION: Xaa = L-2-aminohexanoic acid

<400> SEQUENCE: 26

Phe Arg Glu Ile Lys Gly Tyr Glu Tyr Gln Leu Tyr Val Tyr Ala Ser
 1               5                  10                  15

Asp Xaa Leu Phe Arg Ala Asp Ile Ser Glu Asp Tyr Lys Thr Arg Gly
            20                  25                  30

Arg Lys Leu Leu Arg Phe Asn Gly Pro Val Pro Pro Pro
        35                  40                  45

<210> SEQ ID NO 27
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (29)
<223> OTHER INFORMATION: Xaa =   L-2-aminohexanoic acid

<400> SEQUENCE: 27

Phe Arg Glu Ile Lys Gly Tyr Glu Tyr Gln Leu Tyr Val Tyr Ala Ser
 1               5                  10                  15

Asp Lys Leu Phe Arg Ala Asp Ile Ser Glu Asp Tyr Xaa Thr Arg Gly
            20                  25                  30

Arg Lys Leu Leu Arg Phe Asn Gly Pro Val Pro Pro Pro
        35                  40                  45

<210> SEQ ID NO 28
<211> LENGTH: 45
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (34)
<223> OTHER INFORMATION: Xaa = L-2-aminohexanoic acid

<400> SEQUENCE: 28

Phe Arg Glu Ile Lys Gly Tyr Glu Tyr Gln Leu Tyr Val Tyr Ala Ser
 1               5                  10                  15
Asp Lys Leu Phe Arg Ala Asp Ile Ser Glu Asp Tyr Lys Thr Arg Gly
             20                  25                  30
Arg Xaa Leu Leu Arg Phe Asn Gly Pro Val Pro Pro Pro
         35                  40                  45

<210> SEQ ID NO 29
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (17)
<223> OTHER INFORMATION: Xaa = L-2-aminohexanoic acid

<400> SEQUENCE: 29

Gly Glu Trp Glu Ile Ile Asp Ile Gly Pro Phe Thr Gln Asn Leu Gly
 1               5                  10                  15

Xaa Phe Ala Val Asp Glu Glu Asn Lys Ile Gly Gln Tyr Gly Arg Leu
             20                  25                  30

Thr Phe Asn Lys Val Ile Arg Pro Cys Met Lys Lys Thr Ile Tyr Glu
         35                  40                  45

Asn Glu
     50

<210> SEQ ID NO 30
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (25)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 30

Gly Glu Trp Glu Ile Ile Asp Ile Gly Pro Phe Thr Gln Asn Leu Gly
 1               5                  10                  15

Lys Phe Ala Val Asp Glu Glu Asn Xaa Ile Gly Gln Tyr Gly Arg Leu
             20                  25                  30

```
Thr Phe Asn Lys Val Ile Arg Pro Cys Met Lys Lys Thr Ile Tyr Glu
        35                  40                  45

Asn Glu
    50

<210> SEQ ID NO 31
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (36)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 31

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Xaa Val Ile Arg Pro Cys Met Lys Lys Thr Ile Tyr Glu
        35                  40                  45

Asn Glu
    50

<210> SEQ ID NO 32
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (13)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 32

Gly Glu Trp Glu Ile Ile Asp Ile Gly Pro Phe Thr Xaa Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
        35                  40                  45

Asn Glu
    50

<210> SEQ ID NO 33
<211> LENGTH: 50
<212> TYPE: PRT
```

-continued

```
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (44)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 33

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Xaa Thr Ile Tyr Glu
        35                  40                  45

Asn Glu
    50

<210> SEQ ID NO 34
<211> LENGTH: 50
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<221> NAME/KEY: MOD_RES
<222> LOCATION: (13)
<223> OTHER INFORMATION: Xaa = L-2-aminohexanoic acid
<220> FEATURE:
<221> NAME/KEY: MOD_RES
<222> LOCATION: (25)
<223> OTHER INFORMATION: Xaa = L-2-aminohexanoic acid
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 34

Gly Glu Trp Glu Ile Ile Asp Ile Gly Pro Phe Thr Xaa Asn Leu Gly
 1               5                  10                  15

Lys Phe Ala Val Asp Glu Glu Asn Xaa Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu
    50

<210> SEQ ID NO 35
<211> LENGTH: 207
<212> TYPE: PRT
<213> ORGANISM: Thaumatococcus daniellii
<300> PUBLICATION INFORMATION:
<302> TITLE: DNA ENCODING (LYS46, ASP97, ASP113) AND (LYS46,ASP113,
      ASP137) THAUMATIN I POLYPEPTIDES
<308> DATABASE ACCESSION NUMBER: US005221624A
<310> PATENT DOCUMENT NUMBER: US 5,221,624
```

<311> PATENT FILING DATE: 1989-09-14
<312> PUBLICATION DATE: 1993-06-22

<400> SEQUENCE: 35

```
Ala Thr Phe Glu Ile Val Asn Arg Cys Ser Tyr Thr Val Trp Ala Ala
 1               5                   10                  15

Ala Ser Lys Gly Asp Ala Ala Leu Asp Ala Gly Gly Arg Gln Leu Asn
             20                  25                  30

Ser Gly Glu Ser Trp Thr Ile Asn Val Glu Pro Gly Thr Asn Gly Gly
         35                  40                  45

Lys Ile Trp Ala Arg Thr Asp Cys Tyr Phe Asp Asp Ser Gly Ser Gly
     50                  55                  60

Ile Cys Lys Thr Gly Asp Cys Gly Gly Leu Leu Arg Cys Lys Arg Phe
 65                  70                  75                  80

Gly Arg Pro Pro Thr Thr Leu Ala Glu Phe Ser Leu Asn Gln Tyr Gly
                 85                  90                  95

Lys Asp Tyr Ile Asp Ile Ser Asn Ile Lys Gly Phe Asn Val Pro Met
             100                 105                 110

Asn Phe Ser Pro Thr Thr Arg Gly Cys Arg Gly Val Arg Cys Ala Ala
         115                 120                 125

Asp Ile Val Gly Gln Cys Pro Ala Lys Leu Lys Ala Pro Gly Gly Gly
130                 135                 140

Cys Asn Asp Ala Cys Thr Val Phe Gln Thr Ser Glu Tyr Cys Cys Thr
145                 150                 155                 160

Thr Gly Lys Cys Gly Pro Thr Glu Tyr Ser Arg Phe Lys Arg Leu
                 165                 170                 175

Cys Pro Asp Ala Phe Ser Tyr Val Leu Asp Lys Pro Thr Val Thr
                 180                 185                 190

Cys Pro Gly Ser Ser Asn Tyr Arg Val Thr Phe Cys Pro Thr Ala
                 195                 200                 205
```

<210> SEQ ID NO 36
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 36

```
Gly Glu Trp Glu Ile Ile Asp Ile Gly Pro Phe Thr Gln Asn Leu Gly
 1               5                   10                  15

Lys Phe Ala Val Asp Glu Glu Asn Lys Ile Gly Gln Tyr Gly Arg Leu
             20                  25                  30

Thr Phe Asn Lys Val Ile Arg Pro Cys Met Lys Lys Thr Ile Tyr Glu
         35                  40                  45

Asn Glu Xaa Phe Arg Glu Ile Lys Gly Tyr Glu Tyr Gln Leu Tyr Val
     50                  55                  60

Tyr Ala Ser Asp Lys Leu Phe Arg Ala Asp Ile Ser Glu Asp Tyr Lys
 65                  70                  75                  80
```

Thr Arg Gly Arg Lys Leu Leu Arg Phe Asn Gly Pro Val Pro Pro Pro
            85                  90                  95

<210> SEQ ID NO 37
<211> LENGTH: 95
<212> TYPE: PRT
<213> ORGANISM: Artificial Sequence
<220> FEATURE:
<223> OTHER INFORMATION: Description of Artificial Sequence: As
      described in Kim, Sung-Hou & Joong M. Cho.  1995. CLASS OF
      LOW CALORIE PROEIN SWEETENERS. US Patent
      5,478,923.
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 37

Met Gly Gly Trp Glu Ile Ile Asp Ile Gly Pro Phe Thr Gln Asn Leu
 1               5                  10                  15

Gly Lys Phe Ala Val Asp Glu Glu Lys Lys Ile Gly Gln Tyr Gly Arg
            20                  25                  30

Leu Thr Phe Asn Lys Val Ile Arg Pro Cys Met Lys Lys Thr Ile Tyr
        35                  40                  45

Glu Asn Glu Arg Glu Ile Lys Gly Tyr Glu Tyr Gln Leu Tyr Val Tyr
 50                  55                  60

Ala Ser Asp Lys Leu Phe Arg Ala Asp Ile Ser Glu Asp Tyr Lys Thr
 65                  70                  75                  80

Arg Gly Arg Lys Leu Leu Arg Phe Asn Gly Pro Val Pro Pro Pro
            85                  90                  95

<210> SEQ ID NO 38
<211> LENGTH: 96
<212> TYPE: PRT
<213> ORGANISM: Artificial Sequence
<220> FEATURE:
<223> OTHER INFORMATION: Description of Artificial Sequence: As
      described in Iijima, H. and H. Sone. 1993. Single-stranded
      Monellins for Improved Thermostability. JP
      05/70,494
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 38

Met Gly Glu Trp Glu Ile Ile Asp Ile Gly Pro Phe Thr Gln Asn Leu
 1               5                  10                  15

Gly Lys Phe Ala Val Asp Glu Glu Asn Lys Ile Gly Gln Tyr Gly Arg
            20                  25                  30

Leu Thr Phe Asn Lys Val Ile Arg Pro Cys Met Lys Lys Thr Ile Tyr
        35                  40                  45

Glu Asn Glu Gly Phe Arg Glu Ile Lys Gly Tyr Glu Tyr Gln Leu Tyr
 50                  55                  60

Val Tyr Ala Ser Asp Lys Leu Phe Arg Ala Asp Ile Ser Glu Asp Tyr
 65                  70                  75                  80

Lys Thr Arg Gly Arg Lys Leu Leu Arg Phe Asn Gly Pro Val Pro Pro
            85                  90                  95

<210> SEQ ID NO 39
<211> LENGTH: 96
<212> TYPE: PRT
<213> ORGANISM: Artificial Sequence
<220> FEATURE:
<223> OTHER INFORMATION: Description of Artificial Sequence: As cited in
    Somoza et al. 1995. Chemical Senses Journal
    20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
    Protein.
<303> JOURNAL: Chemical Senses Journal
<304> VOLUME: 20
<306> PAGES: 61-68
<307> DATE: 1995

<400> SEQUENCE: 39

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Glu Lys Thr Ile Tyr Glu
        35                  40                  45

Asn Glu Xaa Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro Pro
                85                  90                  95

<210> SEQ ID NO 40
<211> LENGTH: 96
<212> TYPE: PRT
<213> ORGANISM: Artificial Sequence
<220> FEATURE:
<223> OTHER INFORMATION: Description of Artificial Sequence: As cited in
    Somoza et al. 1995. Chemical Senses Journal
    20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
    Protein.
<303> JOURNAL: Chemical Senses Journal
<304> VOLUME: 20
<306> PAGES: 61-68
<307> DATE: 1995

<400> SEQUENCE: 40

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Lys Thr Ile Tyr Glu
        35                  40                  45

Asn Glu Xaa Phe Arg Glu Ile Lys Gly Tyr Glu Tyr Gln Leu Tyr Val
    50                  55                  60

Tyr Ala Ser Asp Lys Leu Phe Glu Ala Asp Ile Ser Glu Asp Tyr Lys
 65                  70                  75                  80

Thr Arg Gly Arg Lys Leu Leu Arg Phe Asn Gly Pro Val Pro Pro Pro
                85                  90                  95

<210> SEQ ID NO 41

```
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 41

Gly Glu Trp Glu Ile Ile Asp Ile Gly Pro Phe Thr Gln Asn Leu Gly
 1               5                  10                  15

Cys Phe Ala Val Asp Glu Glu Asn Lys Ile Gly Gln Tyr Gly Arg Leu
            20                  25                  30

Thr Cys Asn Lys Val Ile Arg Pro Cys Met Lys Lys Thr Ile Tyr Glu
        35                  40                  45

Asn Glu Xaa Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95

<210> SEQ ID NO 42
<211> LENGTH: 80
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 42

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Met Lys Cys Thr Ile Tyr Glu
        35                  40                  45

Asn Glu Xaa Phe Arg Glu Ile Lys Gly Tyr Cys Tyr Gln Leu Tyr Val
    50                  55                  60

Tyr Ala Ser Asp Lys Leu Phe Arg Ala Asp Ile Ser Glu Asp Tyr Lys
65                  70                  75                  80

<210> SEQ ID NO 43
<211> LENGTH: 96
<212> TYPE: PRT
<213> ORGANISM: Artificial Sequence
<220> FEATURE:
<223> OTHER INFORMATION: Description of Artificial Sequence: As cited in
```

Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 43

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Gln Thr Ile Tyr Gln
            35                  40                  45

Asn Gln Xaa Phe Gln Gln Ile Gln Gly Tyr Glu Tyr Gln Leu Tyr Val
        50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro Pro
            85                  90                  95

<210> SEQ ID NO 44
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 44

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Ser Met Lys Thr Ile Tyr Glu
            35                  40                  45

Asn Glu Xaa Phe Arg Glu Ile Lys Cys Tyr Glu Tyr Gln Leu Tyr Val
        50                  55                  60

Tyr Ala Ser Cys Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro Pro
            85                  90                  95

<210> SEQ ID NO 45
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.

-continued

```
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 45

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Asp Asn Lys Val Ile Arg Pro Cys Met Lys Lys Thr Ile Tyr Glu
            35                  40                  45

Asn Glu Xaa Phe Arg Glu Ile Lys Gly Tyr Glu Tyr Gln Leu Tyr Val
        50                  55                  60

Tyr Ala Ser Asp Lys Leu Phe Arg Ala Asp Ile Ser Glu Asp Tyr Lys
 65                 70                  75                  80

Thr Arg Gly Arg Lys Leu Leu Arg Phe Asn Gly Pro Val Pro Pro Pro
                85                  90                  95

<210> SEQ ID NO 46
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 46

Met Met Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                20                  25                  30

Thr Phe Asn Lys Val Ile Arg Pro Cys Met Lys Lys Thr Ile Tyr Glu
            35                  40                  45

Asn Glu Xaa Phe Arg Glu Ile Lys Gly Tyr Glu Tyr Gln Leu Tyr Val
        50                  55                  60

Tyr Ala Ser Asp Lys Leu Phe Arg Ala Asp Ile Ser Glu Asp Tyr Lys
 65                 70                  75                  80

Thr Arg Gly Arg Lys Leu Leu Arg Phe Asn Gly Pro Val Pro Pro Pro
                85                  90                  95

<210> SEQ ID NO 47
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
```

```
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 47
```

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                 20                  25                  30

Thr Phe Asn Lys Val Ile Arg Pro Cys Met Lys Lys Thr Ile Tyr Glu
             35                  40                  45

Asn Glu Xaa Phe Arg Glu Ile Lys Gly Tyr Cys Tyr Gln Leu Tyr Val
         50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro Pro
                 85                  90                  95

```
<210> SEQ ID NO 48
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 48
```

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
                 20                  25                  30

Thr Phe Asn Lys Val Ile Arg Pro Ser Met Lys Lys Thr Ile Tyr Glu
             35                  40                  45

Asn Glu Xaa Phe Arg Glu Ile Lys Gly Tyr Tyr Gln Leu Tyr Val
         50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro Pro
                 85                  90                  95

```
<210> SEQ ID NO 49
<211> LENGTH: 96
<212> TYPE: PRT
<213> ORGANISM: Artificial Sequence
<220> FEATURE:
<223> OTHER INFORMATION: Description of Artificial Sequence:  As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
```

Protein.
<303> JOURNAL: Chemical Senses Journal
<304> VOLUME: 20
<306> PAGES: 61-68
<307> DATE: 1995

<400> SEQUENCE: 49

Gly Glu Trp Glu Ile Ile Asp Ile Gly Pro Phe Thr Gln Asn Leu Gly
1               5                   10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Val Lys Lys Thr Ile Tyr Glu
        35                  40                  45

Asn Glu Xaa Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95

<210> SEQ ID NO 50
<211> LENGTH: 96
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 50

Gly Glu Thr Glu Glu Ile Asp Ile Gly Pro Phe Thr Gln Asn Leu Gly
1               5                   10                  15

Lys Phe Ala Val Asp Glu Glu Asn Lys Ile Gly Gln Tyr Gly Arg Leu
            20                  25                  30

Thr Phe Asn Lys Val Ile Arg Pro Cys Asp Lys Lys Thr Ile Tyr Glu
        35                  40                  45

Asn Glu Xaa Phe Arg Glu Ile Lys Gly Tyr Glu Tyr Gln Leu Tyr Val
    50                  55                  60

Tyr Ala Ser Asp Lys Leu Phe Arg Ala Asp Ile Ser Glu Asp Tyr Lys
65                  70                  75                  80

Thr Arg Gly Arg Lys Leu Leu Arg Phe Asn Gly Pro Val Pro Pro Pro
                85                  90                  95

<210> SEQ ID NO 51
<211> LENGTH: 95
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal

```
<304> VOLUME: 20
<306> PAGES: 61-68
<307> DATE: 1995

<400> SEQUENCE: 51

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
             20                  25                  30

Thr Phe Asn Lys Val Ile Arg Pro Cys Met Lys Lys Thr Ile Tyr Glu
         35                  40                  45

Asn Glu Xaa Phe Arg Glu Ile Lys Gly Tyr Glu Tyr Gln Leu Tyr Val
         50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val Pro Pro
                 85                  90                  95

<210> SEQ ID NO 52
<211> LENGTH: 93
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
<307> DATE: 1995

<400> SEQUENCE: 52

Gly Glu Trp Glu Ile Ile Asp Ile Gly Pro Phe Thr Gln Asn Leu Gly
 1               5                  10                  15

Lys Phe Ala Val Asp Glu Glu Asn Lys Ile Gly Gln Tyr Gly Arg Leu
             20                  25                  30

Thr Phe Asn Lys Val Ile Arg Pro Cys Met Lys Lys Thr Ile Tyr Glu
         35                  40                  45

Asn Glu Xaa Phe Arg Glu Ile Lys Gly Tyr Glu Tyr Gln Leu Tyr Val
         50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Pro Val
                 85                  90

<210> SEQ ID NO 53
<211> LENGTH: 92
<212> TYPE: PRT
<213> ORGANISM: Artificial Sequence
<220> FEATURE:
<223> OTHER INFORMATION: Description of Artificial Sequence: As cited in
      Somoza et al. 1995. Chemical Senses Journal
      20:61-68.
<220> FEATURE:
<223> OTHER INFORMATION: Xaa = Gly, Ser, Glu or Thr
<300> PUBLICATION INFORMATION:
<302> TITLE: The Taste-active Regions of Monellin, a Potently Sweet
      Protein.
<303> JOURNAL: Chemical Senses Journal
<304> VOLUME: 20
<306> PAGES: 61-68
```

<307> DATE: 1995

<400> SEQUENCE: 53

```
Gly Glu Trp Glu Ile Ile Asp Ile Gly Pro Phe Thr Gln Asn Leu Gly
  1               5                  10                  15

Lys Phe Ala Val Asp Glu Asn Lys Ile Gly Gln Tyr Gly Arg Leu
             20                  25                  30

Thr Phe Asn Lys Val Ile Arg Pro Cys Met Lys Lys Thr Ile Tyr Glu
             35                  40                  45

Asn Glu Xaa Phe Arg Glu Ile Lys Gly Tyr Glu Tyr Gln Leu Tyr Val
             50                  55                  60

Tyr Ala Ser Asp Lys Leu Phe Arg Ala Asp Ile Ser Glu Asp Tyr Lys
 65                  70                  75                  80

Thr Arg Gly Arg Lys Leu Leu Arg Phe Asn Gly Val
                     85                  90
```

<210> SEQ ID NO 54
<211> LENGTH: 207
<212> TYPE: PRT
<213> ORGANISM: Thaumatococcus daniellii
<300> PUBLICATION INFORMATION:
<302> TITLE: DNA ENCODING (LYS46, ASP97, ASP113) AND (LYS46,ASP113, ASP137) THAUMATIN I POLYPEPTIDES
<308> DATABASE ACCESSION NUMBER: US005221624A
<310> PATENT DOCUMENT NUMBER: US 5,221,624
<311> PATENT FILING DATE: 1989-09-14
<312> PUBLICATION DATE: 1993-06-22

<400> SEQUENCE: 54

```
Ala Thr Phe Glu Ile Val Asn Arg Cys Ser Tyr Thr Val Trp Ala Ala
  1               5                  10                  15

Ala Ser Lys Gly Asp Ala Ala Leu Asp Ala Gly Gly Arg Gln Leu Asn
             20                  25                  30

Ser Gly Glu Ser Trp Thr Ile Asn Val Glu Pro Gly Thr Lys Gly Gly
             35                  40                  45

Lys Ile Trp Ala Arg Thr Asp Cys Tyr Phe Asp Ser Gly Arg Gly
 50                  55                  60

Ile Cys Arg Thr Gly Asp Cys Gly Gly Leu Leu Glu Cys Lys Arg Phe
 65                  70                  75                  80

Gly Arg Pro Pro Thr Thr Leu Ala Glu Phe Ser Leu Asn Gln Tyr Gly
                     85                  90                  95

Lys Asp Tyr Ile Asp Ile Ser Asn Ile Lys Gly Phe Asn Val Pro Met
                    100                 105                 110

Asp Phe Ser Pro Thr Thr Arg Gly Cys Arg Gly Val Arg Cys Ala Ala
                    115                 120                 125

Asp Ile Val Gly Gln Cys Pro Ala Lys Leu Lys Ala Pro Gly Gly Gly
                    130                 135                 140

Cys Asn Asp Ala Cys Thr Val Phe Gln Thr Ser Glu Tyr Cys Cys Thr
145                 150                 155                 160

Thr Gly Lys Cys Gly Pro Thr Glu Tyr Ser Arg Phe Phe Lys Arg Leu
                    165                 170                 175

Cys Pro Asp Ala Phe Ser Tyr Val Leu Asp Lys Pro Thr Thr Val Thr
                    180                 185                 190

Cys Pro Gly Ser Ser Asn Tyr Arg Val Thr Phe Cys Pro Thr Ala
                    195                 200                 205
```